US009874353B2

(12) United States Patent
Thabit

(10) Patent No.: US 9,874,353 B2
(45) Date of Patent: Jan. 23, 2018

(54) MODIFIED OVEN DESIGN AND ITS FUNCTIONING

(71) Applicant: Khalid Omar Thabit, Jeddah (SA)

(72) Inventor: Khalid Omar Thabit, Jeddah (SA)

(73) Assignee: Khalid Omar Thabit, Jeddah (SA)

(*) Notice: Subject to any disclaimer, the term of this patent is extended or adjusted under 35 U.S.C. 154(b) by 0 days.

(21) Appl. No.: 14/988,260

(22) Filed: Jan. 5, 2016

(65) Prior Publication Data

US 2017/0191670 A1     Jul. 6, 2017

(51) Int. Cl.
*F24C 1/06* (2006.01)
*F24C 15/14* (2006.01)
*F24C 15/16* (2006.01)

(52) U.S. Cl.
CPC .............. *F24C 1/06* (2013.01); *F24C 15/14* (2013.01); *F24C 15/16* (2013.01)

(58) Field of Classification Search
CPC .. F24C 1/06; F24C 15/14; F24C 15/16; F24C 15/007; F24C 15/02; F24C 15/08; F24C 15/107; F24C 15/164; F24C 15/168; F24C 15/18
USPC ....... 219/396, 402–404, 407, 409, 427, 448, 219/450, 452–454, 460; 126/41 A, 339; 312/334.1, 408
See application file for complete search history.

(56) References Cited

U.S. PATENT DOCUMENTS

| 2,745,937 | A | * | 5/1956 | Welch | F24C 7/087 219/397 |
| 2,958,754 | A | * | 11/1960 | Hahn | H05B 6/763 174/382 |
| 5,011,353 | A | * | 4/1991 | Boyd | F01D 25/005 403/341 |
| 5,335,310 | A | * | 8/1994 | Novy | F27D 99/0006 219/532 |
| 6,222,163 | B1 | * | 4/2001 | Arntz | F24C 1/04 126/39 BA |
| 6,294,769 | B1 | * | 9/2001 | McCarter | H05B 1/023 219/411 |
| 7,340,993 | B2 | * | 3/2008 | Sculuca | A47J 47/16 99/419 |
| 9,335,054 | B2 | * | 5/2016 | Donarski | F24C 3/087 |
| 2006/0003277 | A1 | * | 1/2006 | Jeng | F23D 14/145 431/263 |
| 2010/0326980 | A1 | * | 12/2010 | Shingler | H05B 6/68 219/452.11 |

(Continued)

*Primary Examiner* — Dana Ross
*Assistant Examiner* — James Sims, III
(74) *Attorney, Agent, or Firm* — Geeta Kadambi; Riddhi IP LLC

(57) ABSTRACT

The present disclosure relates to a modified oven design with detachable parts for cooking an edible item. The modified oven as disclosed comprise of a main body; a door; a support, wherein the oven can stand in a vertical position; a ceramic frame, wherein the ceramic frame comprise of a heating element; a ceramic rod; a mesh, wherein the mesh holds an edible item; a drip bar; a sliding rod base with a sliding rod, wherein the sliding rod has a projection whereby it slides into the sliding rod base; a gas fired heater and a control system to cook the edible item. The oven can be used either oven can be used in an electronic mode by using the ceramic frame with heating elements or with a gas mode by using the gas fired heater.

18 Claims, 30 Drawing Sheets

(56) References Cited

U.S. PATENT DOCUMENTS

2013/0101240 A1\* 4/2013 Jahrling .................. F16C 29/00
                                                          384/7
2014/0016916 A1\* 1/2014 Lee ........................... F24C 1/06
                                                          392/309

\* cited by examiner

MODIFIED OVEN DESIGN AND ITS FUNCTIONING

FIELD OF TECHNOLOGY

This disclosure generally relates a modified oven design and its functionality. Further, the disclosure relates to a modified oven design with a grilling and intense heat broiling function wherein a heating element can be detached or attached into the oven along with different parts of the oven.

BACKGROUND

Oven is long being used for heating, baking or drying of a material especially food. Dating back to 29,000 BC, cooking food in oven was a way of preparing meals. Since then the oven has evolved and so do its features. Oven evolved from an earth oven to ceramic oven to gas oven to masonry oven to microwave oven, wall oven and now as countertop oven. The latest oven as being used provides features such as warming, broiling, grilling, roasting, baking, toasting with some being convection and rotisserie features.

However, broiling and grilling features of the presently available and used oven still require food to be turned over at least once in order to be cooked in both sides which many a times takes longer and also may leaves the food uncooked from inside. Further, there is a lot of cleaning following grilling in the presently used oven with in-built grilling features.

SUMMARY

The present disclosure relates to a modified oven design and its functionality. Further, the present disclosure relates to a modified oven design wherein the modified oven design help in heat removal and heat insulation to have a cool outer body of the oven when in use. Also, the present disclosure relates to a modified oven wherein a heating element can be detached or attached into the oven along with other parts. The modified oven can be used in an electronic mode or in a gas mode.

In one embodiment, the modified oven comprise of a main body, wherein the main body comprise of a metallic layer; a door, wherein the door is double glazed; a handle to open or close the door, a heating element, a mesh tray and a control system to perform the functions of the oven. In another embodiment, the modified oven further comprise of a hinge in between the door and the main body of the oven wherein the hinge move with the opening and closing of the door and also helps in keeping the door of the oven open if desired.

In one embodiment, the modified oven comprise of more than one heating element. In another embodiment, the heating elements may be 2, 4, 6, 8, 10 or 12.

In one embodiment, the heating elements could be parentally installed by the manufacturer or could be placed in a ceramic frame. The ceramic frame may be square in shape or in a shape as of the interior of the oven. The ceramic frame can hold more than one heating elements and additional heating elements could be easily added to the frame. The ceramic frame is detachable wherein the ceramic frame may be attached or detached from the interior of the oven through a plug present inside the oven. The oven may have more than one ceramic frame wherein the frames will be parallel to each other and could be placed close to each other in the grilling mode and away from each other in the baking mode. The ceramic frame have a high heat resistance and high electric insulation. Each frame has two male plugs. In the inner part of the oven there will be two ceramic bars holding female sockets and attached the electric current. The ceramic frame can be placed in different positions within the oven such as one in upper end of the oven, one in the lower end of the oven or as per user's convenience and choice.

In one embodiment, the ceramic frame is further attached to a ceramic bar to form an assembly, wherein the ceramic bar holds the ceramic frame to fix the ceramic frame into the oven during its use. The ceramic bar comprise of more than one socket such as two sockets, three sockets. four sockets. five sockets or six sockets. In another embodiment, the ceramic bar holds the electric current within it. In yet another embodiment, the ceramic bar comprise of more than one socket on two sides of the rod out of the four sides rod has. The ceramic frame can then be positioned in a horizontal position or a vertical position within the oven by placing them within the ceramic bars through the sockets present on ceramic bars. The ceramic frame is pushed into the socket and placed inside the oven and as the electric power to the oven is switched ON the ceramic rod heats up and heats the ceramic frame and hence the heating rods.

In one embodiment, the electronic functions of the oven allow the user to enter the type of food to be grilled, then the program determines the cooking time and beeps when the food is done. In another embodiment, the modified oven can be used in an electronic mode or in a gas mode. The electronic mode can be used by using the ceramic frame with heating elements and the gas mode can be used by using the gas fired heater.

In one embodiment, the main body of the oven comprise of two layers of metal covering and a cavity in between the metal coverings. In another embodiment, the main body of the oven comprise of a cover layer and an outer layer along with a cavity in between the cover layer and the outer layer. The cavity as disclosed has a fiberglass insulation placed within it.

In one embodiment, the outer layer further comprise of an air grill window on a side of the oven. In another embodiment, the air grill window may be present on the top side of the oven or may be present on the side of the oven which is opposite to the side of the support when the oven is in a vertical position. The air grill window may be sealed with a double protective glass or may have a sliding protective glass door or a sliding grill mesh door which can be open and close during its functioning. The sliding glass door or mesh may be operated from outside of the window. The cold air could flow into from side grills during the grilling function (oven in vertical position) into the inner oven cavity moving hot air to the top of the oven and then extruded from the top air grill. This process will keep the oven exterior cool during the grilling process.

In one embodiment, the modified oven may comprise of a support wherein the oven with the aid of the support can stand in a vertical position. In another embodiment, the support may be on all the corners of a side as selected or as a broad stand on the side of the oven such that oven can be placed in a vertical position. Thus, the modified oven can be used in both a horizontal position and a vertical position and can be switched accordingly.

In one embodiment, a drip bar may be introduced into the modified oven for the collection of excess oil or other residue material when the oven is placed in a vertical position. In another embodiment, the drip bar may be a V-shaped bar with a stand wherein the drip bar can be attached into and/or detached from the oven for functions such as to drain excess oil from the bar or to remove other residue material. The drip bar may be attached within the modified oven by putting the stand of the drip bar into a hole in the oven and locking it with a state of the known technique. The stand and a hole for the stand can be locked and unlocked by a simple click. The drip bar is placed on the same side of the oven as to where the support is for placing the modified oven in a vertical position.

In one embodiment, the modified oven may further comprise of a collecting tray. In another embodiment, the collecting tray may be in a rectangle, square shape or other desired shape and is placed outside of and under the oven when the oven is in a vertical position and can be used in broiling functions.

In one embodiment, a sliding rod base is attached into a side of the body of the modified oven. In another embodiment, the sliding rod base may be attached on the left wall or the right wall of the main body or to the upper wall or the lower wall of the main body of the oven. The sliding rod base as disclosed comprise of a sliding rod base and a sliding rod wherein the sliding rod can easily slide in and out of the sliding rod base. The sliding rod base may be fixed into the oven or be a detachable one.

In one embodiment, the sliding rod base has three sides wherein the fourth side has a straight opening. In another embodiment, the sliding rod further comprise of small projections wherein the sliding rod slide into the sliding rod base and the projection pass through the open end of the sliding rod base.

In one embodiment, the modified oven further comprise of a gas fired heater. In another embodiment, the gas fired heater is located on the same side of the oven as of the position of heating element or underneath the heating element. A user has option of using the heating elements or the gas fired heater to cook an edible item as desired.

In one embodiment, the modified oven comprise of a control system comprising of control functions for grilling and broiling of an edible item wherein the control system comprise of control functions for baking, heating, toasting, roasting, grilling and broiling of an edible item. In another embodiment, the control system may be electronic, computerized or manual.

In one embodiment, the modified oven comprise of a main body; a door; a handle to open or close the door; a ceramic frame, a ceramic bar, a mesh; a drip bar; a collecting tray; a sliding rod base, wherein the sliding rod base may house a sliding rod; a ceramic frame, a ceramic rod, a gas fired heater and a control system to cook an edible material as desired using different functions of the oven choosing from control system. In another embodiment, the modified oven comprise of a main body, wherein the body comprise of two layers of metal covering and a cavity in between the metal coverings; a door, wherein the door is double glazed; a handle to open or close the door; a ceramic frame, wherein the ceramic frame comprise of a heating element; a ceramic bar, wherein the ceramic bar holds the ceramic frame and forms an assembly to be placed inside the oven; a mesh; a drip bar, wherein the drip bar can be attached into and detached from the oven; a collecting tray; a sliding rod base wherein the sliding rod base may house a sliding rod; a gas fired heater and a control system to cook an edible item. In yet another embodiment, the modified oven comprise of a main body; a door; a support wherein the oven can stand in a vertical position; a handle to open or close the door; a ceramic frame, wherein the ceramic frame comprise of a heating element; a ceramic bar, wherein the ceramic bar holds the ceramic frame and forms an assembly to be placed inside the oven in a vertical position; a mesh; a drip bar, wherein the drip bar can be attached into and detached from the oven; a collecting tray; a sliding rod base wherein the sliding rod base house a sliding rod; a ceramic frame, a ceramic rod; a gas fired heater and a control system to cook an edible item.

In one embodiment, the modified oven further comprise of a grilling mesh. In another embodiment, the grilling mesh has a handle to allow a user to put in or take out the grilling mesh during intense heat grilling of the edible item. In yet another embodiment, the handle is a detachable handle wherein once the mesh is inside of the oven, a user can detach the handle and close the oven.

In one embodiment, the grilling mesh as disclosed comprise of two layers of mesh, mesh 1 and mesh 2, wherein the edible item can be placed in between the mesh 1 and mesh 2 for a proper holding of the edible item for grilling. Mesh 1 may have an elongated handle and mesh 2 may have a short handle or vice versa. In another embodiment, the elongated handle may be used to hold the grilling mesh and short handle may be used to place mesh 2 onto mesh 1 once a user place an edible item in between the two layers of mesh. Further, the grilling mesh comprise of a horizontal and vertical lined structure with equal spaces in between. The spaces will help in holding the edible item in place for proper cooking and to dissipate the extra heat during grilling.

In one embodiment, the modified oven may further comprise of a heating mesh. In another embodiment, the heating mesh may be placed on the front face of the oven in order to reduce heat waste during the grilling function. The heating mesh comprise of a horizontal and vertical lined structure with equal spaces in between for a regular and adequate dissipation of heat.

Thus, in one embodiment, the heating mesh is placed in the front of the oven through an opening on the top of the oven when in a horizontal position. The heating mesh opening has a sliding door with a handle on the top of the oven wherein a user may use the handle to slide the door open and place the heating mesh inside of the oven and close the sliding door if the user is not using the heating mesh during the oven functioning. A user may place the handle to open or close the door for heating mesh may be located on top of the modified oven, on any side of the modified oven or within the control system of the modified oven.

In one embodiment, the modified oven comprise of a main body; a door; a handle to open or close the door; a detachable ceramic frame, wherein the ceramic frame comprise of a heating element; a ceramic bar; a heating mesh; a drip bar; a collecting tray; a sliding rod base wherein the sliding rod base may house a sliding rod; a gas fired heater; an air grill window on the main body; a door for putting a heating mesh in and out of the oven; and a control system to cook an edible item as desired using functions of the oven. In another embodiment, the modified oven comprise of a main body, wherein the body comprise of two layers of metal covering and a cavity in between the metal coverings; a door; a support wherein the oven can stand in a vertical position; a handle to open or close the door, wherein the door is double glazed; a detachable ceramic frame, wherein the ceramic frame comprise of a heating element; a ceramic bar, wherein the ceramic bar holds the ceramic frame and forms an assembly to be placed inside the oven; a heating mesh; a drip bar, wherein the drip bar can be attached into and detached from the oven; a collecting tray; a sliding rod base with a sliding rod; a gas fired heater; an air grill window; a door for putting a heating mesh in and out of the oven; a heating mesh, wherein the mesh can be fixed onto the sliding rod and can then slide into and out of the oven and a control system to heat or broil an edible item.

In one embodiment, the modified oven further comprise of a hamburger holder wherein the hamburger holder can slide in and out of the modified oven by fixing it onto a sliding rod. In another embodiment, the hamburger holder as disclosed further comprise of a holder frame, a supporting rod; a holder plate and more than one holder ring. The hamburger holder ring as disclosed is used to hold the hamburger in place wherein the ring is placed into the holder plate and is further supported through one or more than one supporting rod. The hamburger ring can be of varying size and can be easily put in and out of the holder plate. In some embodiments, the holder plate has an opening for a ring to be placed into it. The hamburger holder may hold more than one ring in the holder frame.

In one embodiment, the hamburger holder frame may be a square or a rectangular frame. In another embodiment, the frame comprise of a top side, a bottom side and two side walls wherein the top side comprise of a hole of a size such that the projections on the sliding rod can fit into the hole. In yet another embodiment, the hamburger holder frame further comprises of more than one supporting rod to hold the ring into place. The supporting rods are placed on both side of the ring by mounting them on the side walls of the holder frame.

Thus, in one embodiment, a modified oven for grilling a hamburger comprise of a main body; a door; a handle to open or close the door; a detachable ceramic frame, wherein the ceramic frame comprise of a heating element; a ceramic bar; a drip bar; a collecting tray; a sliding rod base with a sliding rod; a gas fired heater; an air grill window; a hamburger holder wherein the hamburger holder can be fixed into the sliding rod and can slide in and out of the oven; and a control module to grill a hamburger using functions of the oven. In another embodiment, the modified oven for grilling the hamburger comprise of a main body, wherein the main body comprise of two metallic layers and a cavity in between the metallic layers; a door, wherein the door is double glazed; a support wherein the oven can stand in a vertical position; a handle to open or close the door; a detachable ceramic frame, wherein the ceramic frame comprise of a heating element; a ceramic bar, wherein the ceramic bar holds the ceramic frame and forms an assembly to be placed inside the oven; a drip bar, wherein the drip bar can be attached into and detached from the oven; a collecting tray; a sliding rod base with a sliding rod; a gas fired heater; an air grill window; a hamburger holder wherein the hamburger holder can be fixed into the sliding rod and can slide in and out of the oven; and a control system to grill a hamburger using functions of the oven.

In one embodiment, the modified oven further comprise of an accessory holder frame. In another embodiment, the accessory holder frame comprise of four sides such as a top, bottom, left and right side. In yet another embodiment, the top side of the accessory holder frame comprise of a hole of a size such that the projections on the sliding rod can fit into the hole. Further, the left side and right side of the holder frame comprise of a hole and the number of hole will depend on the length of the left and right side of the frame.

In one embodiment, a modified oven comprise of a main body; a door; a handle to open or close the door; a detachable ceramic frame, wherein the ceramic frame comprise of a heating element; a ceramic bar; a drip bar; a collecting tray; a sliding rod base with a sliding rod; a gas fired heater; an air grill window; an accessory holder frame; and a control system to cook an edible item using functions of the oven. In another embodiment, the accessory holder frame may hold a rod with a hook attached to it whereas in another embodiment, the accessory holder frame may hold a rod with a nail attached to it. In yet another embodiment, the accessory holder frame may hold a rod with frame for a circular or other shaped structure within it. A user may attached the rod as disclosed in the holes on the left side and right side of the accessory holder frame and the frame can then be fixed into the sliding bar to be slide inside of the modified oven.

In one embodiment, the modified oven further comprise of a skewer holder frame. In another embodiment, the skewer holder frame comprises of four sides such as a top, bottom, left and right side. In yet another embodiment, the top side of the skewer holder frame comprise of a hole of a size such that the projections on the sliding rod can fit into the hole. In yet another embodiment, the left side and right side of the skewer holder frame comprise of a projection pointing in the outwards direction throughout the length of the left side and right side of the skewer holder frame. A grove at the end of the projection can hold the skewer. A user may put the skewer with edible item in the groves of the projection present on the left side and right side of the skewer holder frame and the frame can then be fixed into the sliding bar to be slide inside of the modified oven.

In one embodiment, a modified oven comprise of a main body; a door; a handle to open or close the door; a detachable ceramic frame, wherein the ceramic frame comprise of a heating element; a ceramic bar; a drip bar; a collecting tray; a sliding rod base with a sliding rod; a gas fired heater; an air grill window; a skewer holder frame; and a control system to cook an edible item using functions of the oven. In another embodiment, the skewer holder frame may be fixed with the sliding rod and is then slide into the sliding bar base for the edible item to be grilled or broiled as per user's interest.

In one embodiment, the modified oven further comprise of a hook holder frame. In another embodiment, the hook holder frame comprises of four sides such as a top, bottom, left and right side. In yet another embodiment, the top side of the hook holder frame comprise of a hole of a size such that the projections on the sliding rod can fit into the hole. The strip is joined from three sides to the top, left and right side of the hook holder frame. The strip carries more than one hook attached onto it to hold the edible item for cooking.

In one embodiment, a strip of metal running through the length of the top side of the hook holder is attached onto the hook holder frame. The strip is joined from three side to the top, left and right side of the hook holder frame. In another embodiment, the strip carries more than one hook attached onto it to hold the edible item for cooking. A user may hang an edible item onto the hook as on the strip and the hook holder frame can then be fixed into the sliding bar to be slide inside of the modified oven.

In one embodiment, a modified oven comprise of a main body; a door; a handle to open or close the door; a detachable ceramic frame, wherein the ceramic frame comprise of a heating element; a ceramic bar; a drip bar; a collecting tray; a sliding rod base with a sliding rod; a gas fired heater; an air grill window; a hook holder frame; and a control system to cook an edible item using functions of the oven. In another embodiment, an edible item may be hanged onto the hook on the hook holder frame, wherein the frame may then be fixed with the sliding rod and is then slide into the sliding bar base for the edible item to be grilled or broiled as per user's interest.

In one embodiment, the modified oven further comprise of a drum stick holder frame. In another embodiment, the drum stick holder frame comprises of four sides such as a top, bottom, left and right side. In yet another embodiment, the top side of the drum stick holder frame comprise of a hole of a size such that the projections on the sliding rod can fit into the hole. Further, the drum stick holder comprise of at least one drum stick holder plate placed between the left and right side of the drum stick holder frame.

In one embodiment, the drum stick holder comprise of a hole large enough to hold a drum stick edible item. In another embodiment, the drum stick holder plate may have more than one hole running throughout the plate. Further, there can be more than one drum stick holder plate running between the left and right side of the drum stick holder frame. A user may put the edible item into the hole on the drum stick holder plate and the drum stick holder frame can then be fixed into the sliding bar to be slide inside of the modified oven.

In one embodiment, a modified oven comprise of a main body; a door; a handle to open or close the door; a detachable ceramic frame, wherein the ceramic frame comprise of a heating element; a ceramic bar; a drip bar; a collecting tray; a sliding rod base with a sliding rod; a gas fired heater; an air grill window; a drum stick holder frame; and a control system to cook an edible item using functions of the oven. In another embodiment, the edible item may be placed into the drum stick holder frame, wherein the frame may then be fixed with the sliding rod and is then slide into the sliding bar base for the edible item to be grilled or broiled as per user's interest.

In one embodiment, a method of using the modified oven with the grilling function is disclosed. The method as disclosed comprises: placing a detachable ceramic frame into the oven, wherein the ceramic frame is fixed with a ceramic rod and forms an assembly to be placed inside the oven; placing a sliding bar into the oven through a sliding rod base, wherein the sliding bar is placed over the ceramic frame or in between two ceramic frames and contain an edible item to be grilled; placing the edible item into any one of the grilling mesh, heating mesh, skewer holder frame, accessory holder frame, hamburger holder frame or hook holder frame to the projection on the sliding rod; switching ON the grilling module through a control system of the modified oven to grill the edible item. In another embodiment, a method of using the modified oven with the broiling function is disclosed. The method as disclosed comprise of placing a ceramic frame into the oven, wherein the ceramic frame is fixed with a ceramic rod and forms an assembly to be placed inside the oven; placing a sliding bar into the oven through a sliding rod base, wherein the sliding bar contain an edible item to be broiled; placing the edible item into any one of the heating mesh, skewer holder frame, accessory holder frame, hamburger holder frame or hook holder frame to the projection on the sliding rod; switching ON the broiling module through the electronic switch control section of the oven to broil the edible item.

In some embodiment, a method of using the modified oven with the grilling apparatus further comprise of attaching a thermostat with the edible material wherein the thermostat will help in monitoring the temperature of the edible material while grilling and will further help the user to decide when to switch OFF the grilling module; and setting a time and other parameters for the grilling through the electronic switch control section.

Other features will be apparent from the accompanying figures and from the detailed description that follows.

BRIEF DESCRIPTION OF THE DRAWINGS

Example embodiments are illustrated by way of example and no limitation in the tables and in the accompanying figures, like references indicate similar elements and in which.

DETAILED DESCRIPTION

The present disclosure relates to a modified oven wherein the oven can perform grilling and heat broiling functions apart from other regular functions. Modified oven or oven may be used interchangeably throughout the application and has the same meaning in the context of the application.

Figure 1:
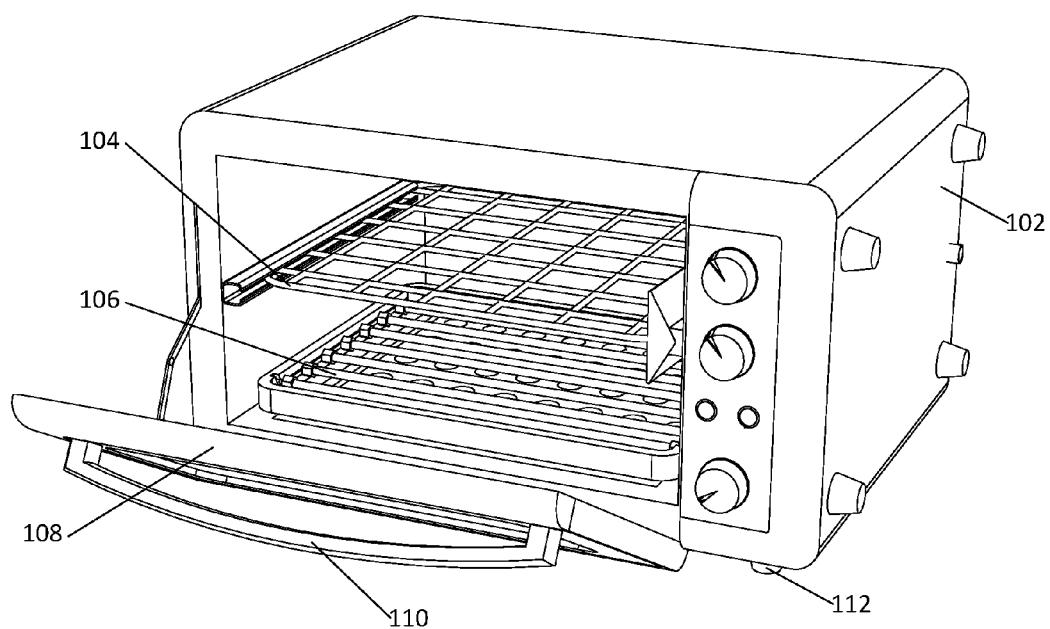
FIG. 1 shows features of a prior art oven.

FIG. 1 shows a prior art oven 102 as presently used. The oven till date are used while placed in a horizontal position (as referenced to ground level) with the foot 112 of the oven placed at the bottom of the oven 102. The oven further comprise of a heating element 106, a door 108, a handle 110 and a mesh tray 104 to place edible item for cooking. These oven's usually features baking, heating, toasting, broiling, grilling, roasting and rotisserie features. However, it is still a problem when a consumer is looking for a convenient, fast and efficient grilling and broiling options inside their cooking space. None of the oven's provide a feature whereby the edible item can be grilled without turning the food on both sides at least once and without hassles of cleaning the grill or oven after cooking.

The following brief description details parts and functioning of a modified oven as disclosed below. The modified oven has detachable parts which can be placed in and out of the oven or may be fixed inside the oven as per user's choice. The detachable parts can be easily placed inside and out of the oven.

Figure 2A:
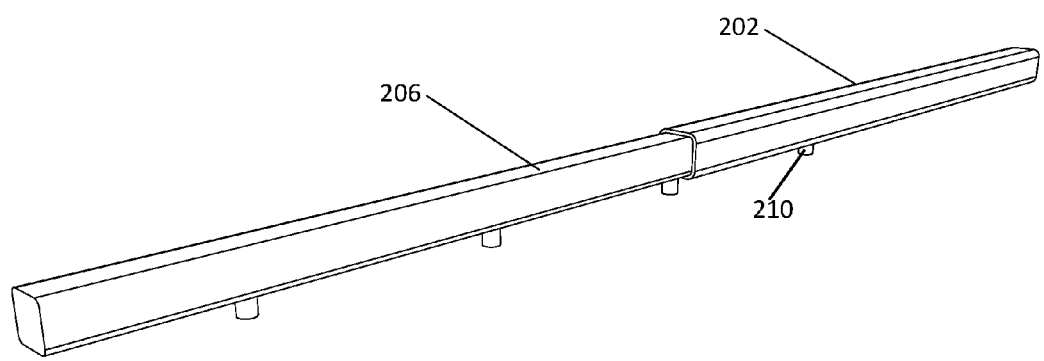
FIGS. 2A and 2B shows a sliding rod base and a sliding rod with projections.
Figure 2B:
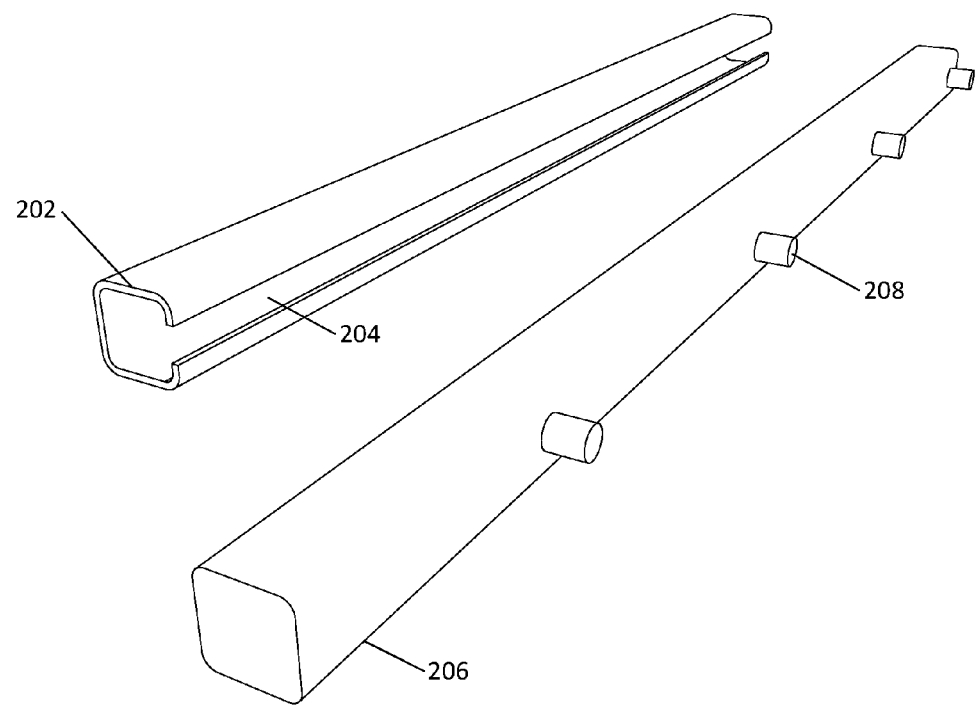

FIGS. 2A and 2B shows parts of a sliding rod base 210 and a sliding rod 206. The sliding rod base comprise of a hollow frame 202 wherein the hollow frame has three sides with one side has straight opening 204. The sliding rod 206 comprise of a solid rod structure with projections 208 on it. The sliding bar may comprise of one or more than one projection. The projections as disclosed can vary in shape and size as per the manufacturer or user demands. The sliding rod 206 can slide smoothly in and out of the sliding rod base 210. The sliding rod base may be fixed inside of the oven or may be temporary attached and detached from the oven.

Figure 3:
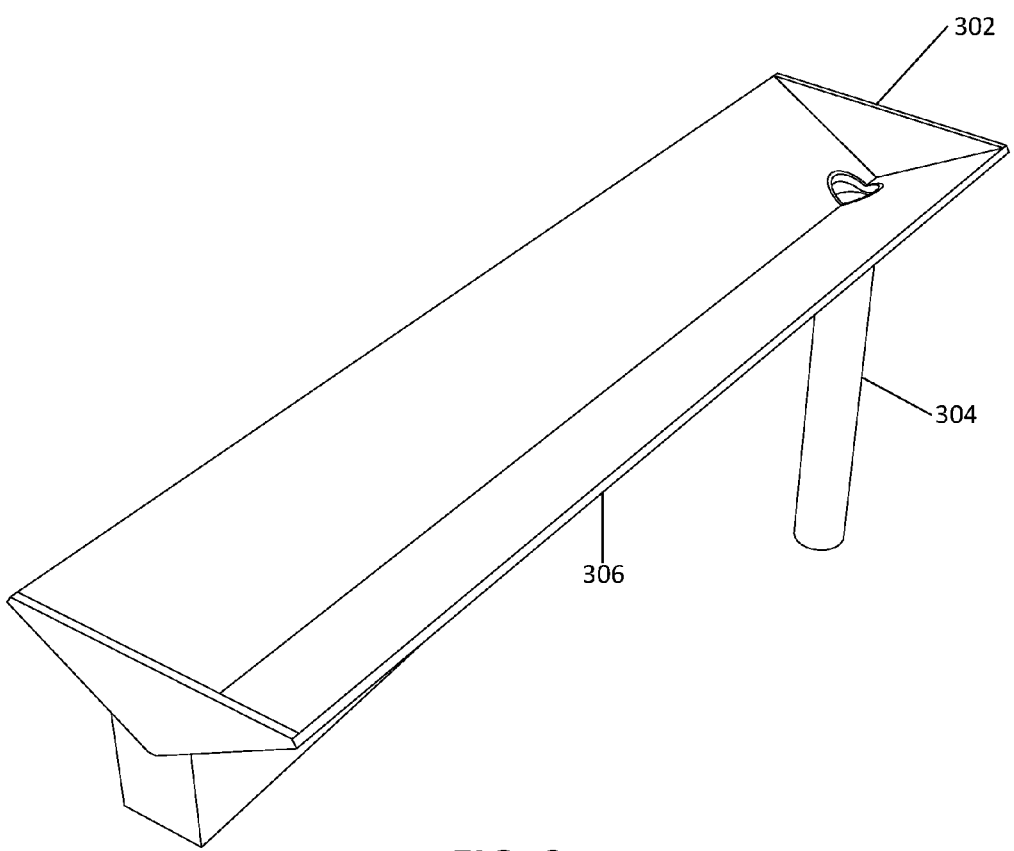
FIG. 3 shows a drip bar.

FIG. 3 shows structural details of a drip bar 306. The drip bar 306 as shown is a V-shaped drip bar 302 and a small stand 304. The drip bar may be fixed or may be detachable from the modified oven. The modified oven comprise of a hole wherein the size of the hole is such that the stand can fit into the hole. The drip can be locked and unlocked for its functioning. The drip bar is placed on the same side of the oven as to where the support is for placing the modified oven in a vertical position.

Figure 4:
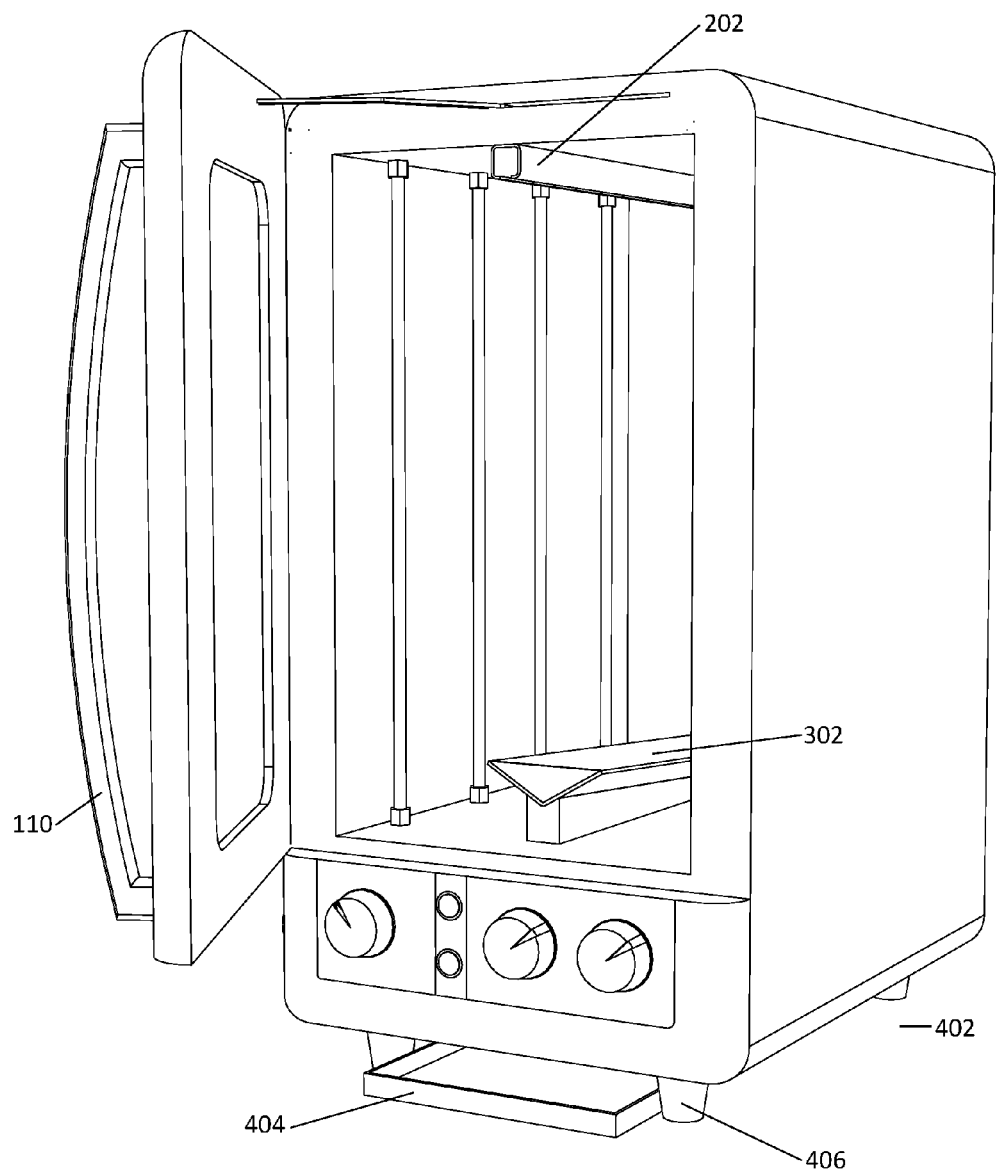
FIG. 4 shows a modified oven in a vertical position with a sliding rod base, a collecting tray and a drip bar.

FIG. 4 shows a modified oven in a vertical position 402 with a drip bar 306 and a sliding rod base 202 fixed into the oven. The oven may comprise of a support such as legs 406 such that the oven can stand in a vertical position. The support may be small legs on all four corners of the side. The modified oven may comprise of more than one heating element 106. The oven further also comprise of a collecting tray 404 wherein the collecting tray collects excess residual or food particles when the food is cooked in the oven.

Figure 5:
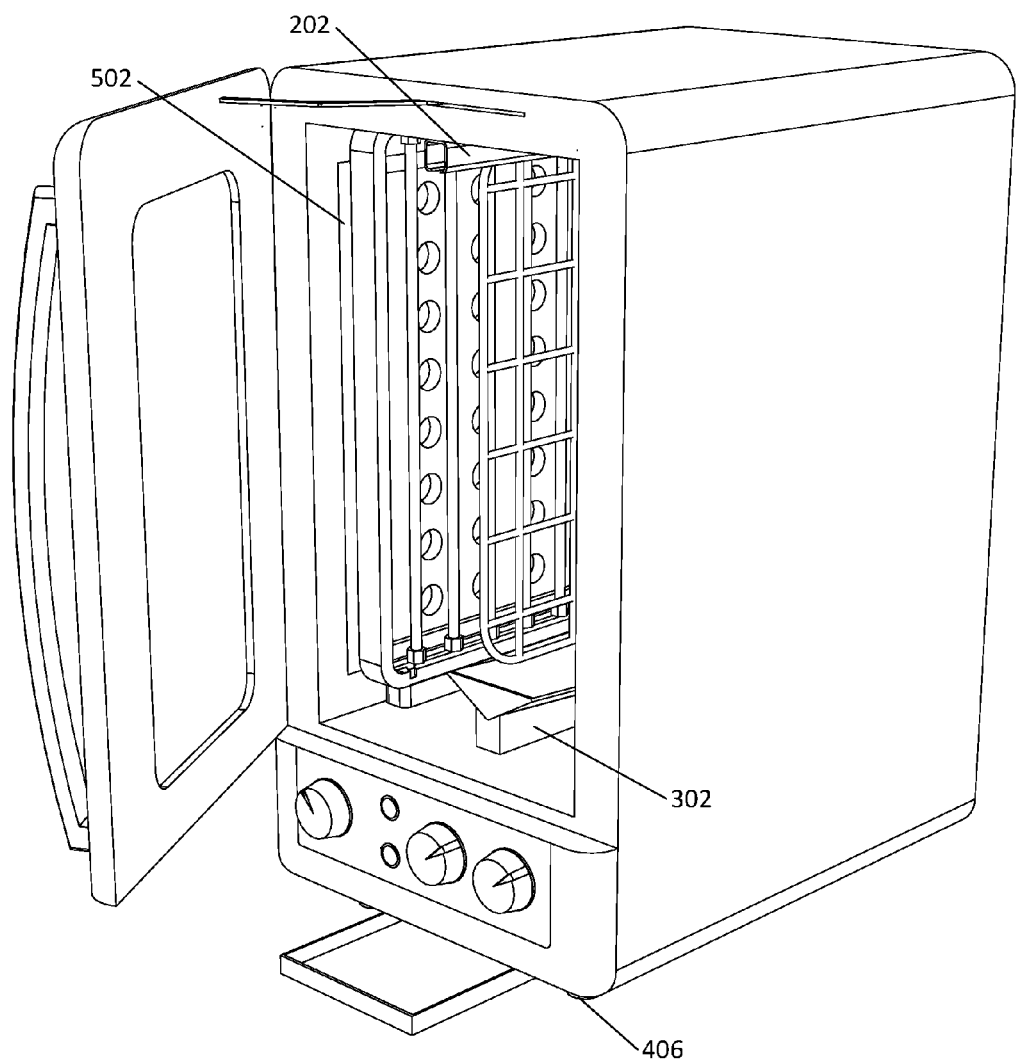
FIG. 5 shows a modified oven in a vertical position with a gas fired heater.

FIG. 5 shows a modified oven in a vertical position 402 wherein the modified oven may also comprise of a gas fired heater 502 to provide extra heating during the broiling and grilling functions. The gas fired heater is located on the same side as of the location of heating element in the oven or is underneath the heating element. A user has the option of using the heating element or the gas fired heater or both for the oven functioning. The electric heater structure 504 for the electronic mode is also shown.

Figure 6:
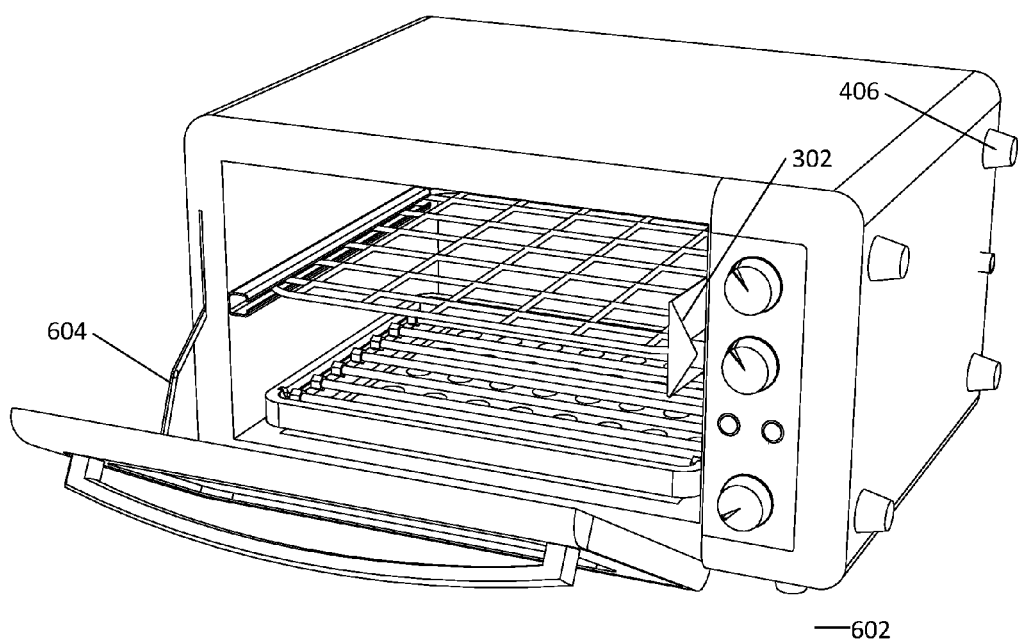
FIG. 6 shows a modified oven in a horizontal position with a gas fired heater.

FIG. 6 shows a modified oven in a horizontal position 602. The oven as in horizontal position can be used as a normal oven performing all the functions such as baking, heating, toasting, grilling and others. The door 108 of the oven also has a hinge 604 attached to it to facilitate a smooth opening and closing of the door 108 for its functioning and also to keep the door open for a long during the grilling and broiling functions.

Figure 7A:
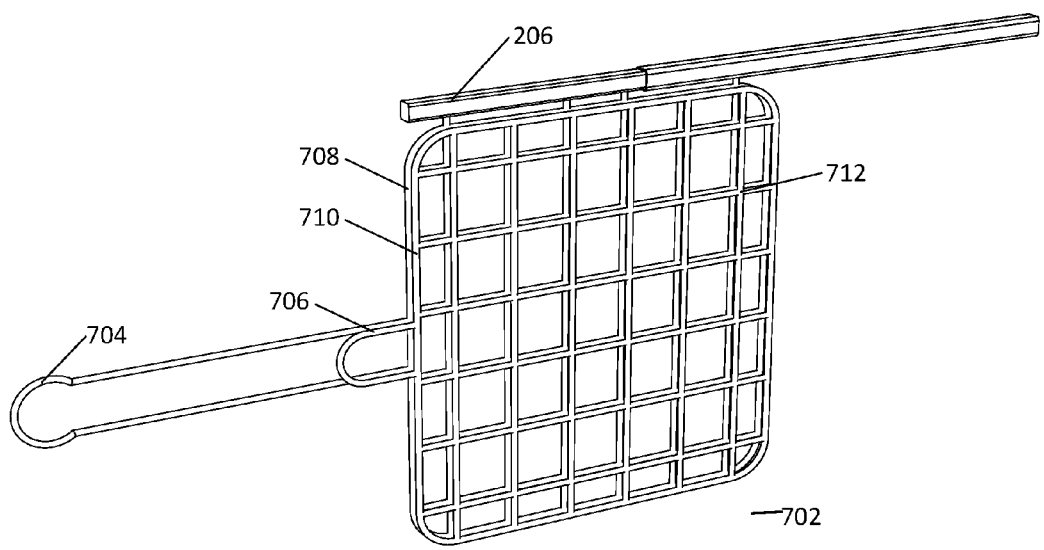
FIGS. 7A-7C shows details of a grilling mesh and its use within the modified oven.
Figure 7B:
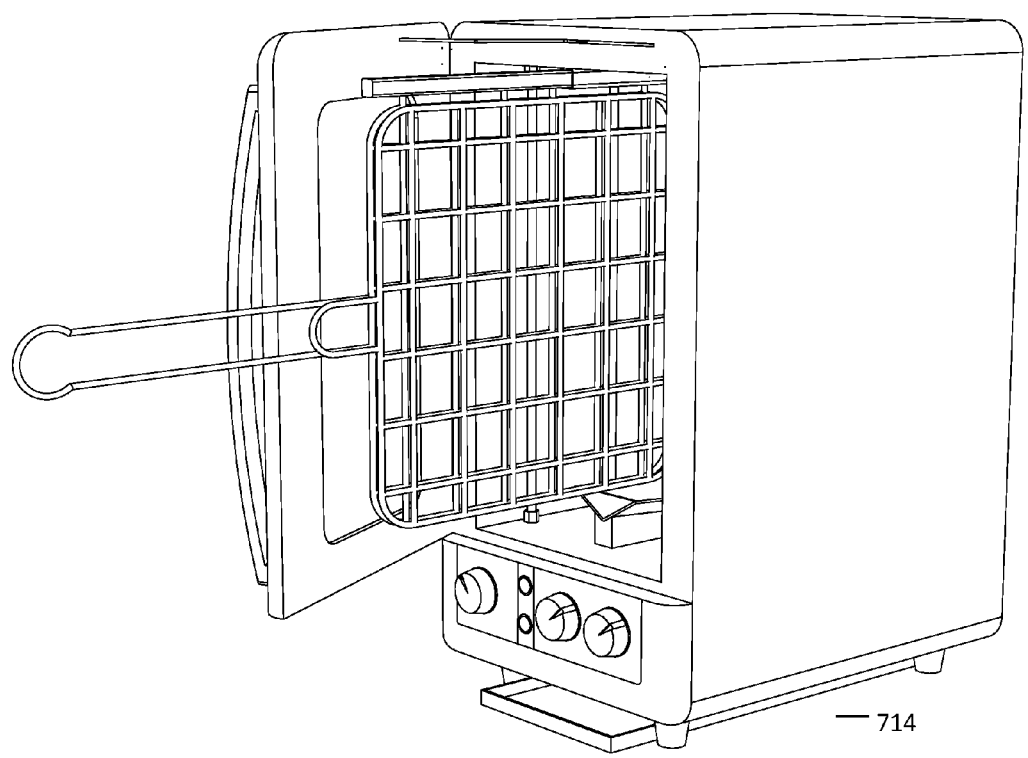
Figure 7C:
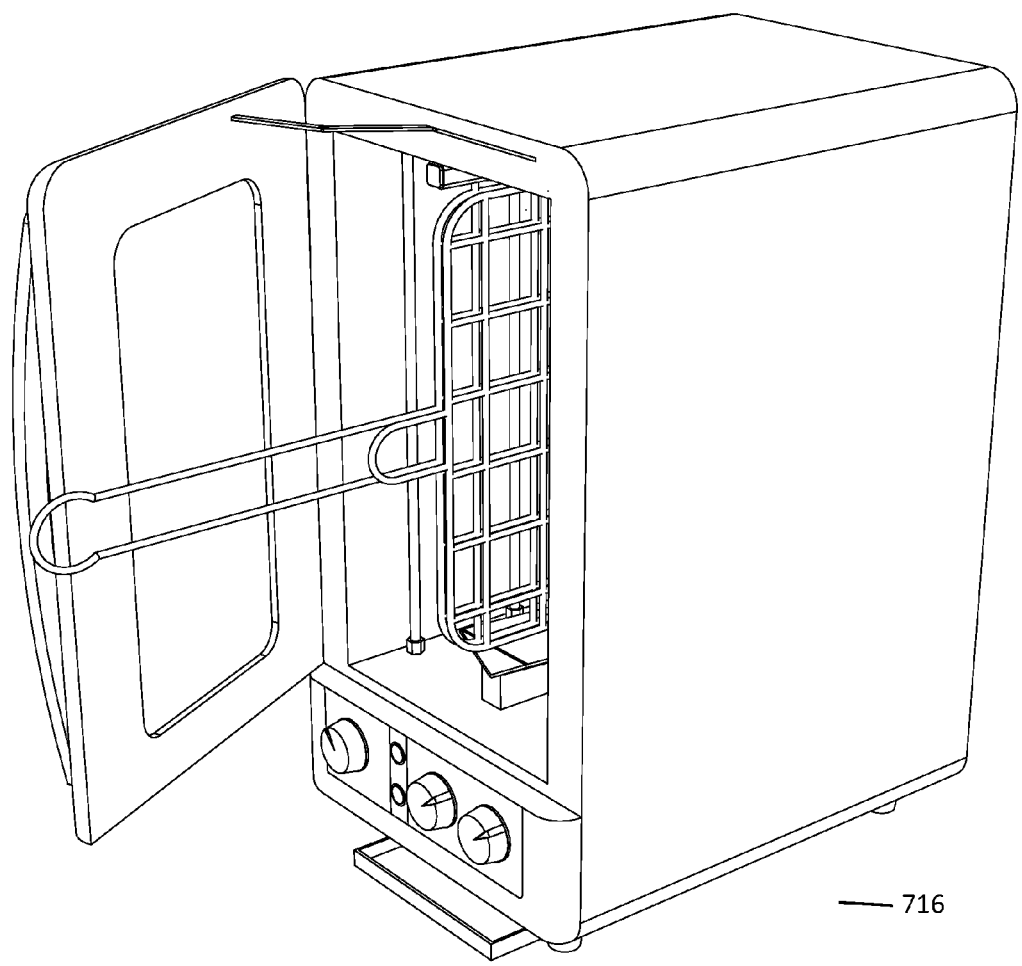

FIGS. 7A-7C shows a grilling mesh 702 wherein the grilling mesh can handle an edible item to be grilled. The grilling mesh may comprise of an elongated handle 704 and a short handle 706. Further, the grilling mesh comprise of two layers of mesh such as mesh 1; 708 and mesh 2; 710, wherein the edible item in between the mesh 1 and mesh 2. The mesh helps in holding the edible item such as food in place during the grilling or broiling functions. The elongated handle 704 of the grilling mesh may be used to hold the grilling mesh for its functioning and a short handle 706 may be used to place mesh 2 onto mesh 1 for holding the food for its cooking. Further, the grilling mesh comprise of a horizontal and vertical lined structure 712 with equal spaces in between. The regular sized spaces help in dissipating the excess heat energy during the food cooking and help in maintaining the temperature of the food.

The grilling mesh can be hooked onto the sliding rod 206 by entangling the horizontal and vertical lined structure 712 into the projections and then sliding the sliding rod into the sliding rod base 210. The grilling mesh can then be put inside of the modified oven as shown in FIGS. 7B (714) and 7C (716) wherein the grilling mesh in completely inside of the oven and is ready for cooking.

The sliding rod, sliding rod base and the grilling mesh may be made up of any oven and grill safe material. Further, the grilling mesh may work with a slide in and out mechanism or may be fixed through an in-built hook inside of the modified oven.

Figure 8A:
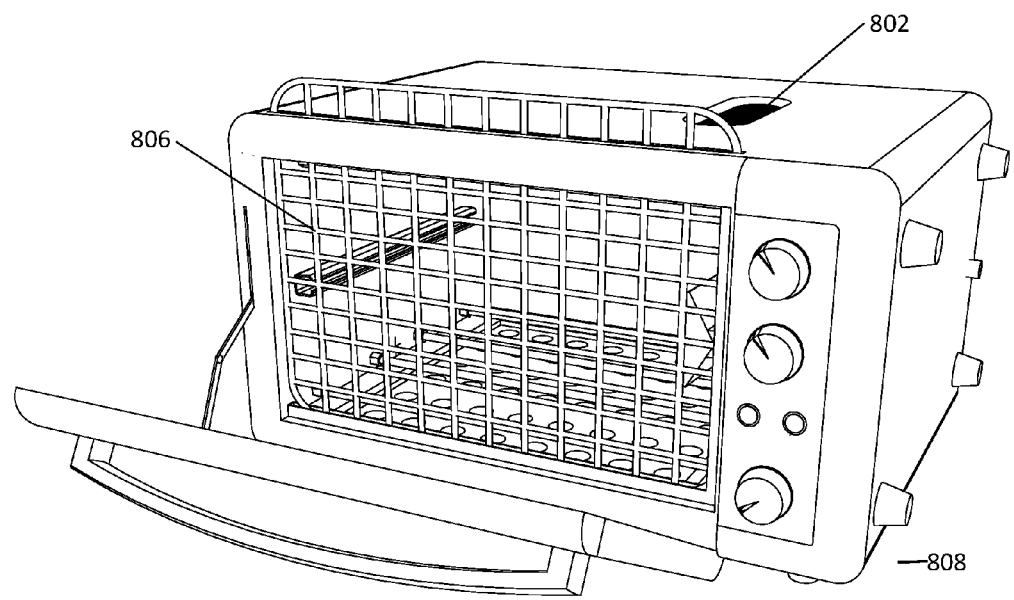
FIGS. 8A-8B shows details of a heating mesh and its use within the modified oven.
Figure 8B:
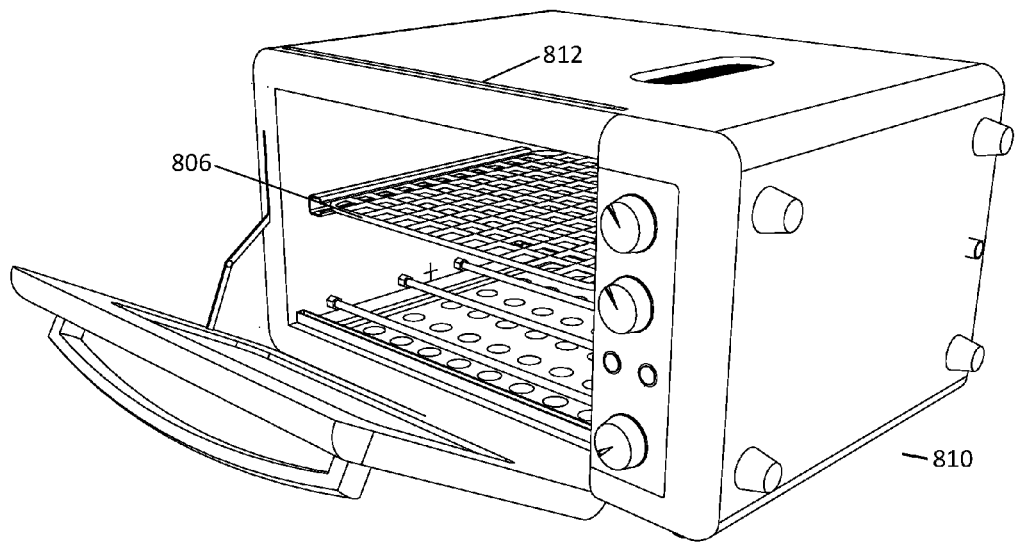

FIGS. 8A-8B shows a modified oven with an air grill window 802 and a heating mesh 806. The air grill window may be present on one side of the oven or on more than one side of the oven. Preferably, the air grill window is present on the top of the main body of the oven 802 when in a horizontal position and maybe on a side of the main body of the oven which is opposite to side where there is extra pair of stands. The air grill window may be sealed with a double layer of protective glass or may be comprise of a sliding protective glass. The sliding protective glass can be opened or closed with the help of a handle present on the outside of the window and thus can be managed from outside when the oven is ON. The functioning of the air grill window may also be controlled through control functions present on the oven.

The double layer of protective glass has a vacuum in between it so as to manage the heat within the oven. To control the inside temperature when the oven is ON, a user may open the window and close it as desired and required.

As shown in FIGS. 8A-8B, the heating mesh may be placed on the front face of the oven when in an open position. The heating mesh is a horizontal and vertical lines structure which is of equal size as of a mesh tray present within a standard or regular oven. The heating mesh can be slide into the oven through an opening. The opening can be present on the top side of the oven 812 or on the left or right side of the oven. As shown in FIGS. 8A and 8B, the heating mesh can be placed on the front face of the oven (808) or inside of the oven (810) when the oven is in a horizontal position. The heating mesh opening may have a sliding door with a handle on the side of the door wherein a user may slide the handle to open the door and place the mesh in between the oven and further to close the door once the mesh in out or mesh is inside of the oven in a horizontal position.

Figure 9A:
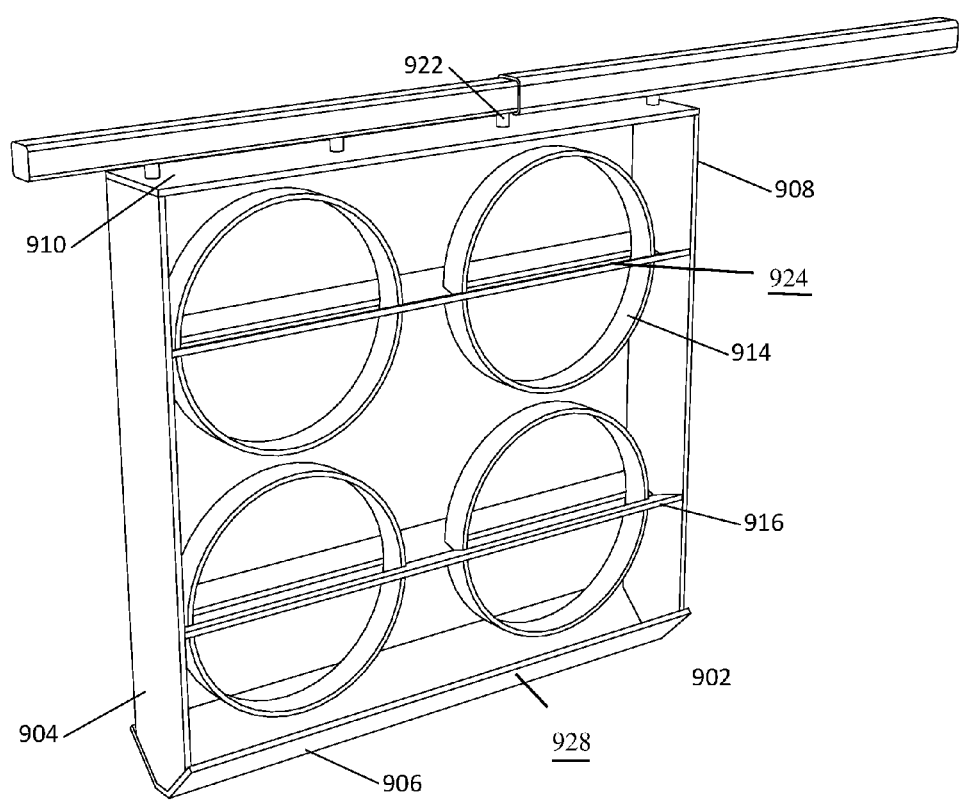
FIGS. 9A-9B shows details of a hamburger holder and its use within the modified oven.
Figure 9B:
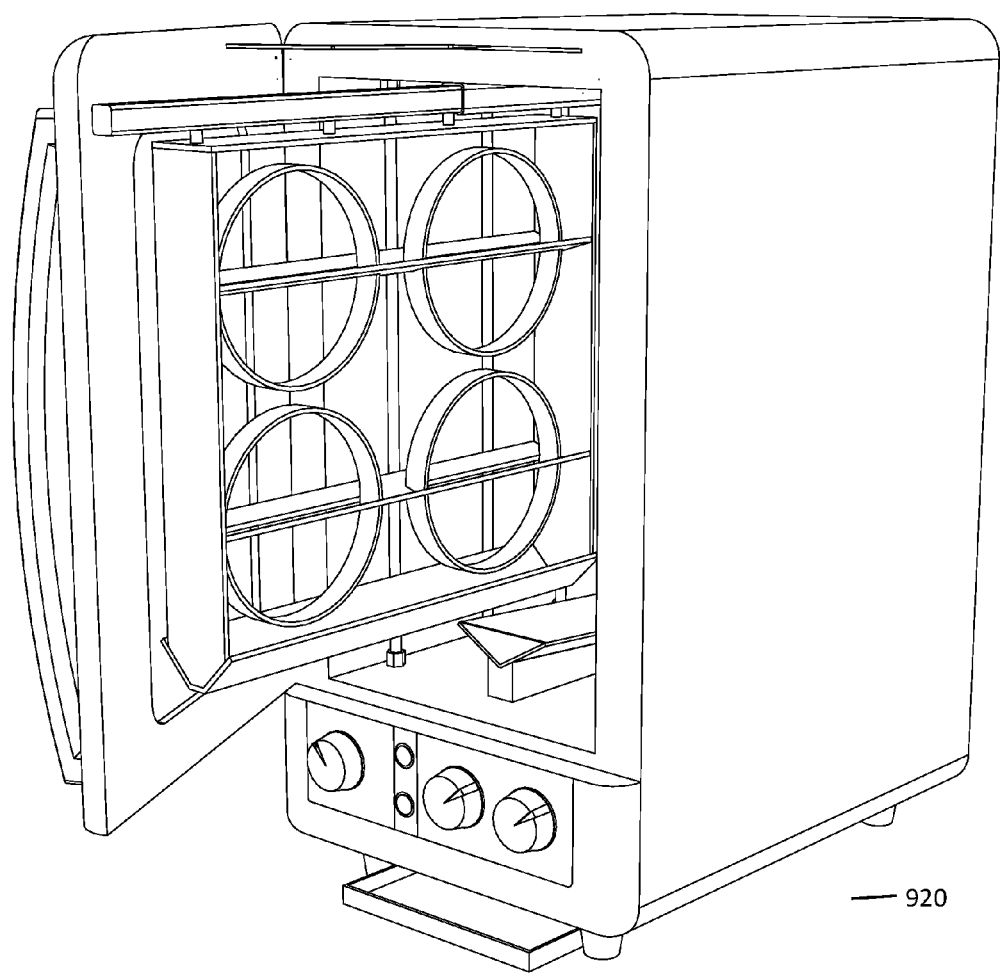

FIGS. 9A-9B shows details of a hamburger holder wherein the hamburger holder can hold a hamburger for grilling. The hamburger holder as shown comprise of a holder frame 902, a holder plate 916; a ring 914 and a slot 924 to hold the hamburger in place while the oven is in operation. A drip tray 928 to hold the dripping grease from the hamburger while cooking. The hamburger holder ring 914 as disclosed is used to hold the hamburger in place. The frame comprise of 4 sides such as a top side 910, a bottom side 906 and two side walls (904 and 908). The top side of the frame 910 comprise of holes 922, wherein the holes are of a size such that the projections on the sliding rod can fit nicely into the holes to make a single unit. This helps in movement of the frame inside and outside of the modified oven. The sliding rod can slide into the sliding rod frame and thus helps in putting the frame into the oven for grilling of food item.

The frame as disclosed may be of a square or a rectangular shape. The holder plate 916 as disclosed comprise of openings for the fitting of the rings within the frame. This will also aid in proper grilling of the food item within the ring. The ring 914 as disclosed can be easily put into the holder plate 916 and can be easily taken out of the holder plate 916 as shown in FIG. 9B (920). The fixing of the hamburger frame into the sliding rod 206 will aid in sliding of the frame into the oven and also to take it out of the oven once the food is cooked.

Figure 10A:
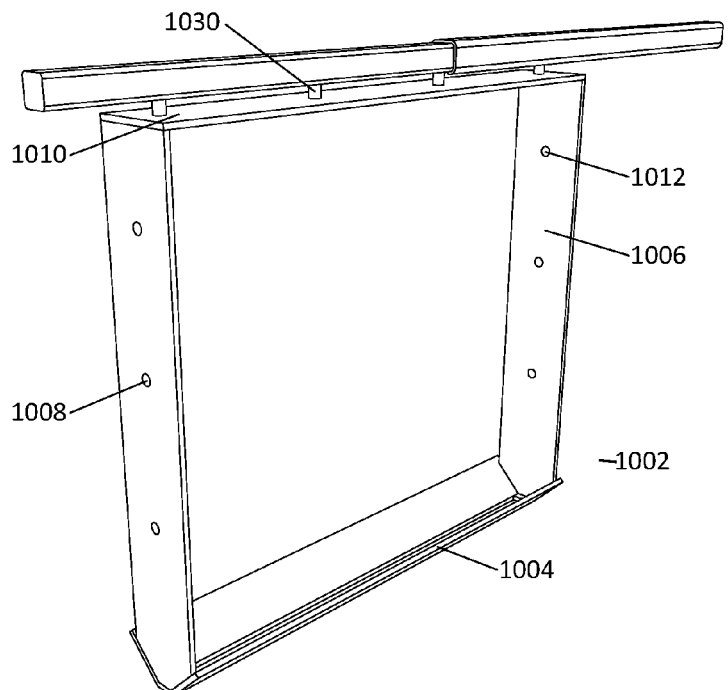
FIGS. 10A-10F shows an accessory holder and its use.
Figure 10B:
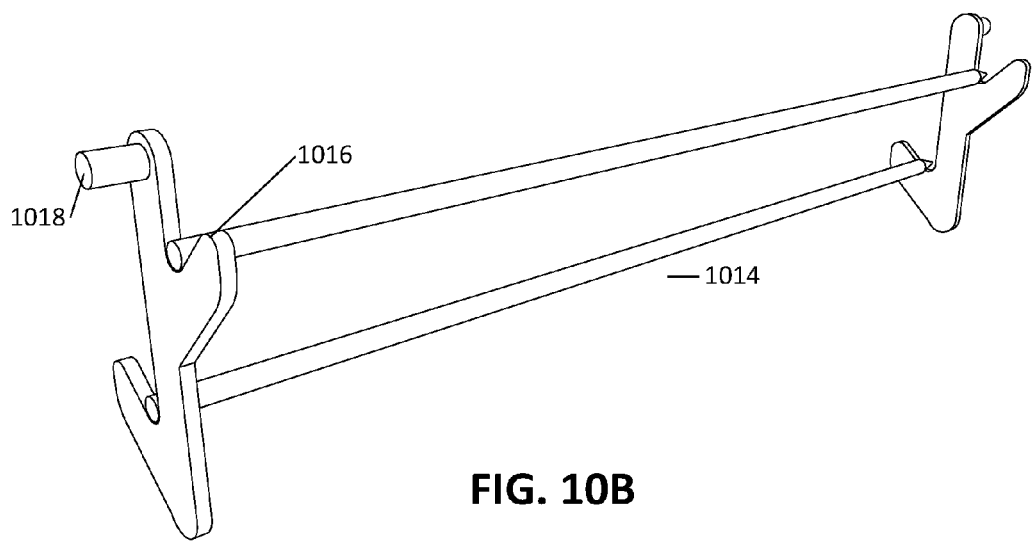
Figure 10C:
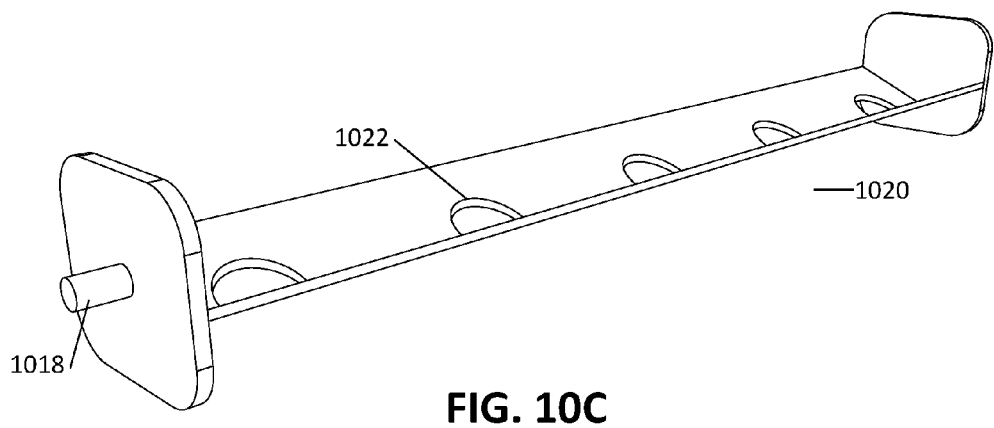
Figure 10D:
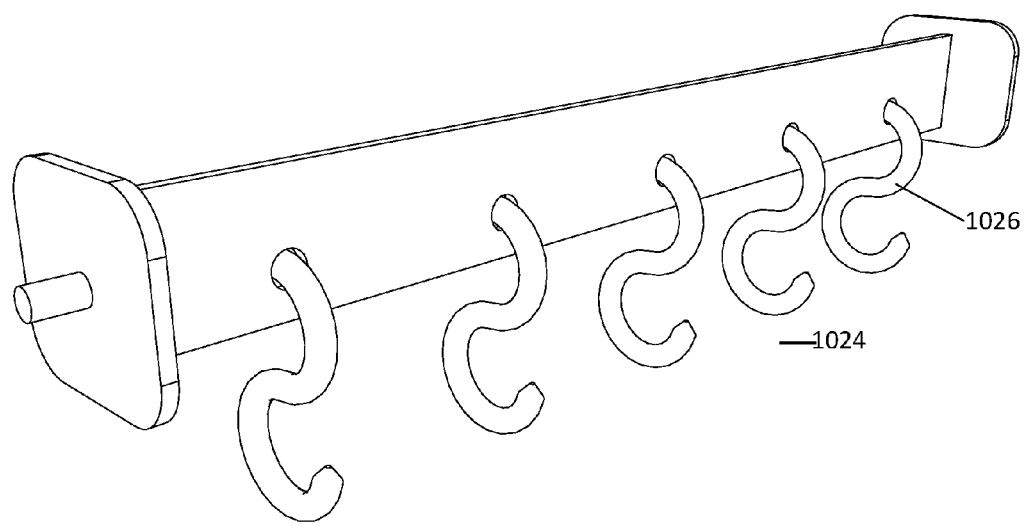
Figure 10E:
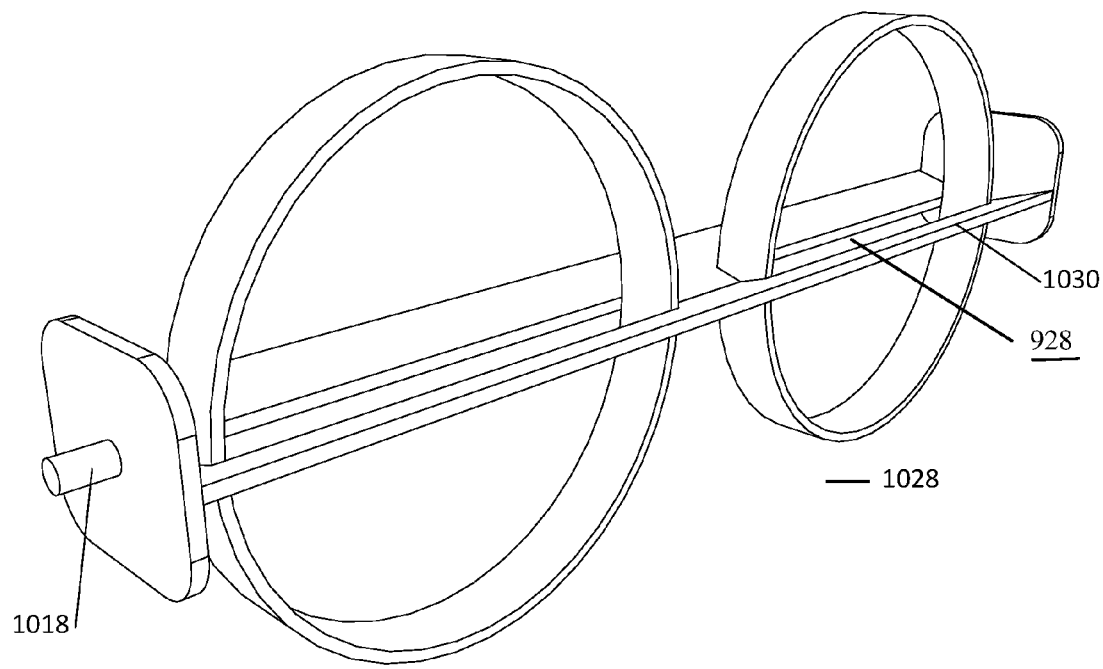
Figure 10F:
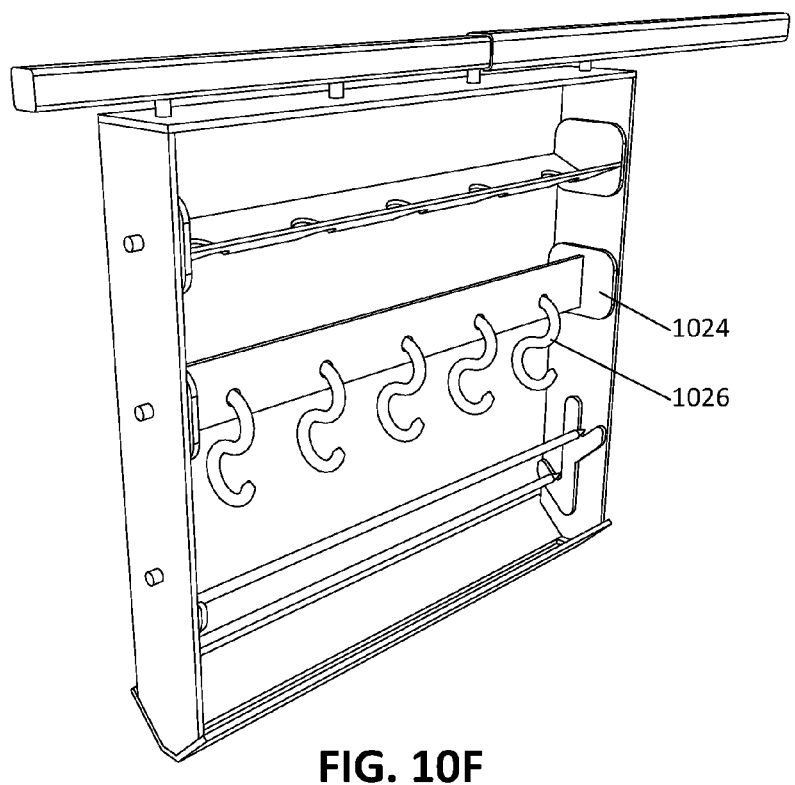

FIGS. 10A-10F shows structural details of an accessory holder frame 1002. As shown in the FIG. 10A, the holder frame 1002 comprise of four sides such as a top side 1010, a bottom side 1004, a left side 1008 and a right side 1006. The top side 1010 of the holder frame 1002 comprise of a hole 1030, wherein the size of the hole is such that the projections 208 on the sliding bar 206 fits into the hole and make it a single unit. The left and right side of the holder frame also comprise of openings 1012. FIG. 10B shows a rod 1014 with spikes 1016 on both sides of the rod. The rod 1014 further comprise of a support arm 1018. The shape and size of the support arm is such that the arm can fit into the hole as present on the left side 1008 and right side 1006 of the accessory holder frame. FIG. 10C shows a rod 1020 with a hole 1022 in it, wherein the hole can hold the edible item such as food onto it for grilling or broiling. FIG. 10D shows a rod 1024 with hooks 1026 attached onto it. The hooks can hold the edible item for broiling. FIG. 10E shows a rod 1028 with a ring frame 1030 into it which can hold a ring structure 914 or other such structures. FIG. 10F shows the rod 1024 with hooks 1026 attached to it and the rod is placed within the holder frame 1002. The holder frame can then be assembled with the supporting rod and can then be placed inside the oven by sliding into the sliding rod frame. Square metallic rod 1032 is shown in the figures that help take the food items out of the oven.

Figure 11A:
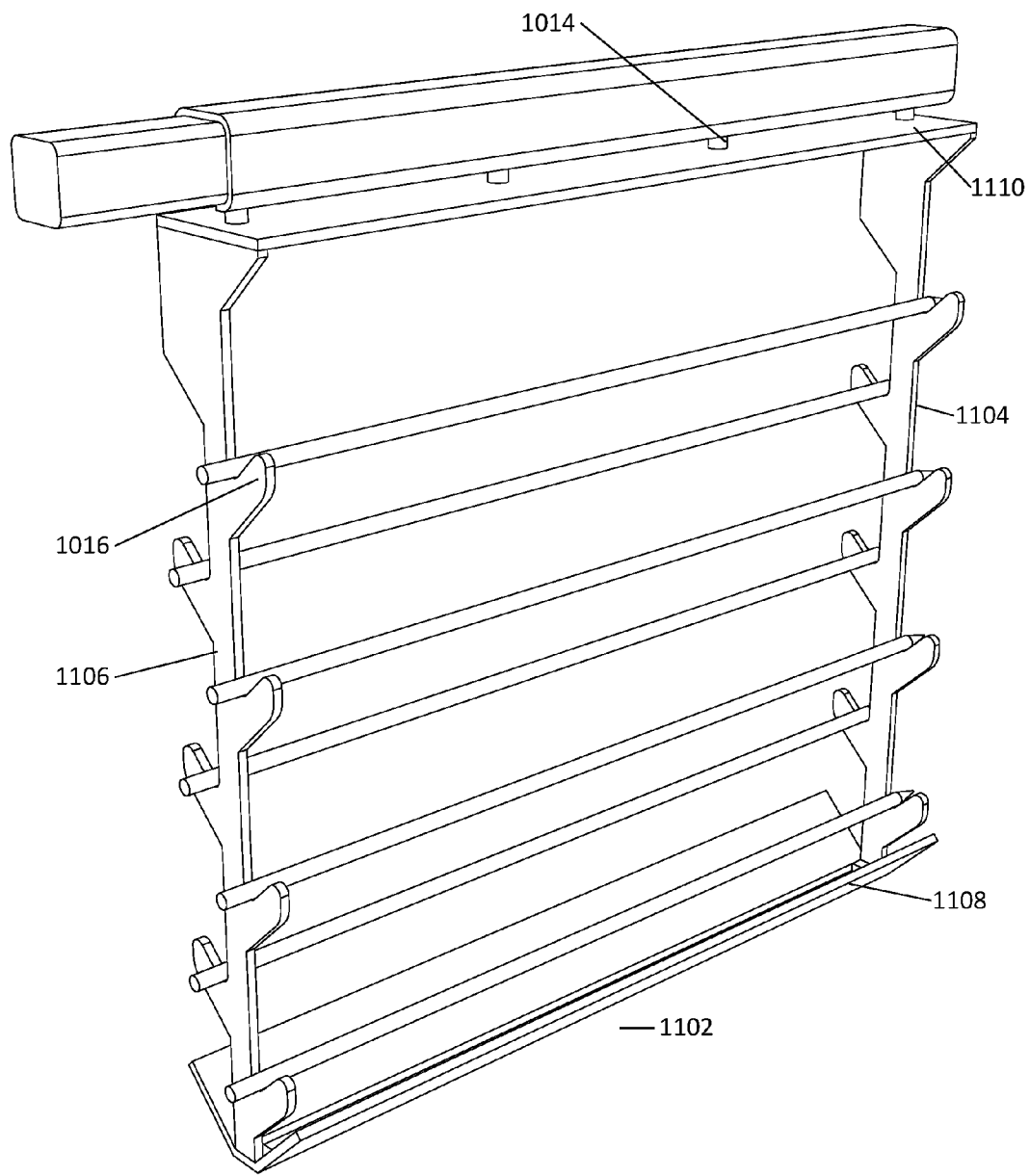
FIGS. 11A-11B shows a skewer holder and its use.
Figure 11B:
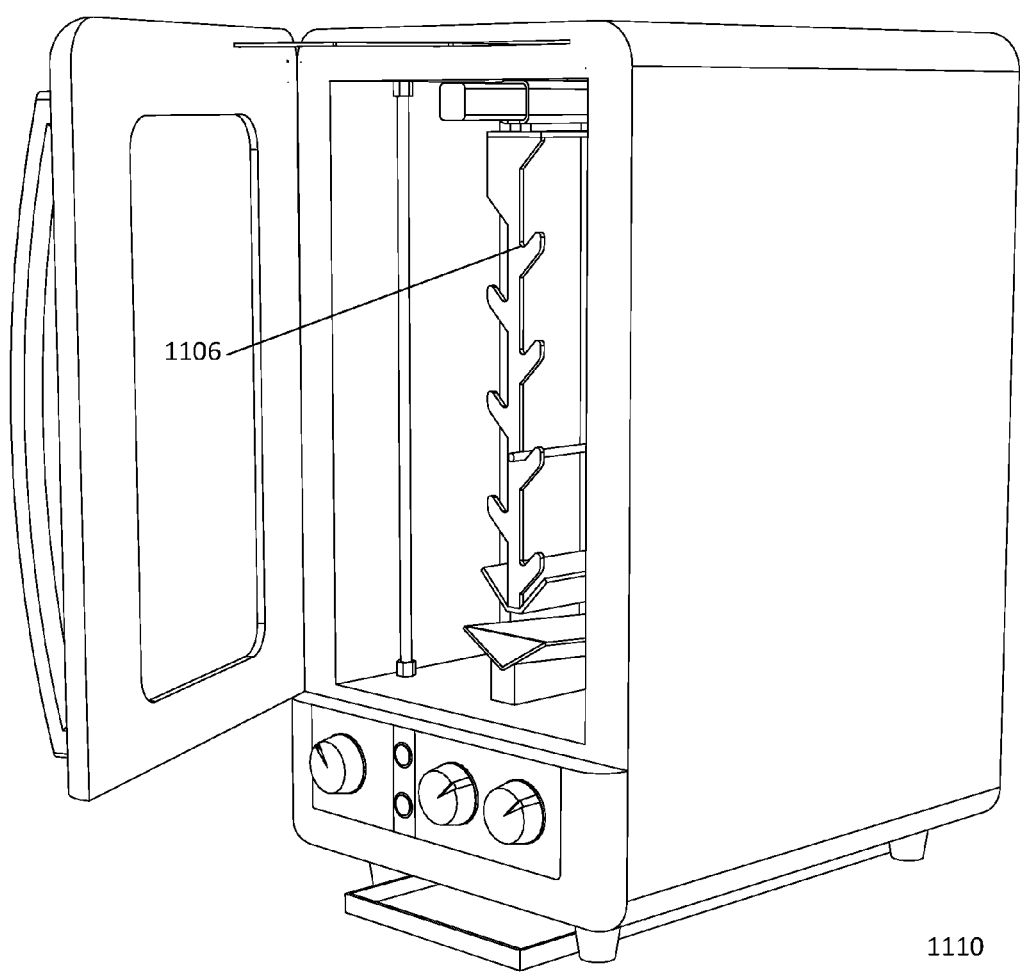

FIGS. 11A and 11B show a skewer holder frame 1102. The skewer holder frame as shown comprise of a top side 1110, a bottom side 1108, a left side 1106 and a right side 1104. The left side 1106 and right side 1104 of the skewer holder frame comprise of spikes 1112 protruding outside of the frame. The size and number of spikes on one side of the skewer frame may vary. There is no fixed number of spikes and no fixed size of the spikes. The top side 1110 of the skewer frame comprise of a hole 1014 wherein the size of the hole is such that the projection on the sliding rod can fit into the holes to make it a single unit. As shown in FIG. 11B, the skewer holder can be fixed with the sliding rod (1114) and be placed inside the modified oven by sliding the rod through the rod frame 1110.

Figure 12A:
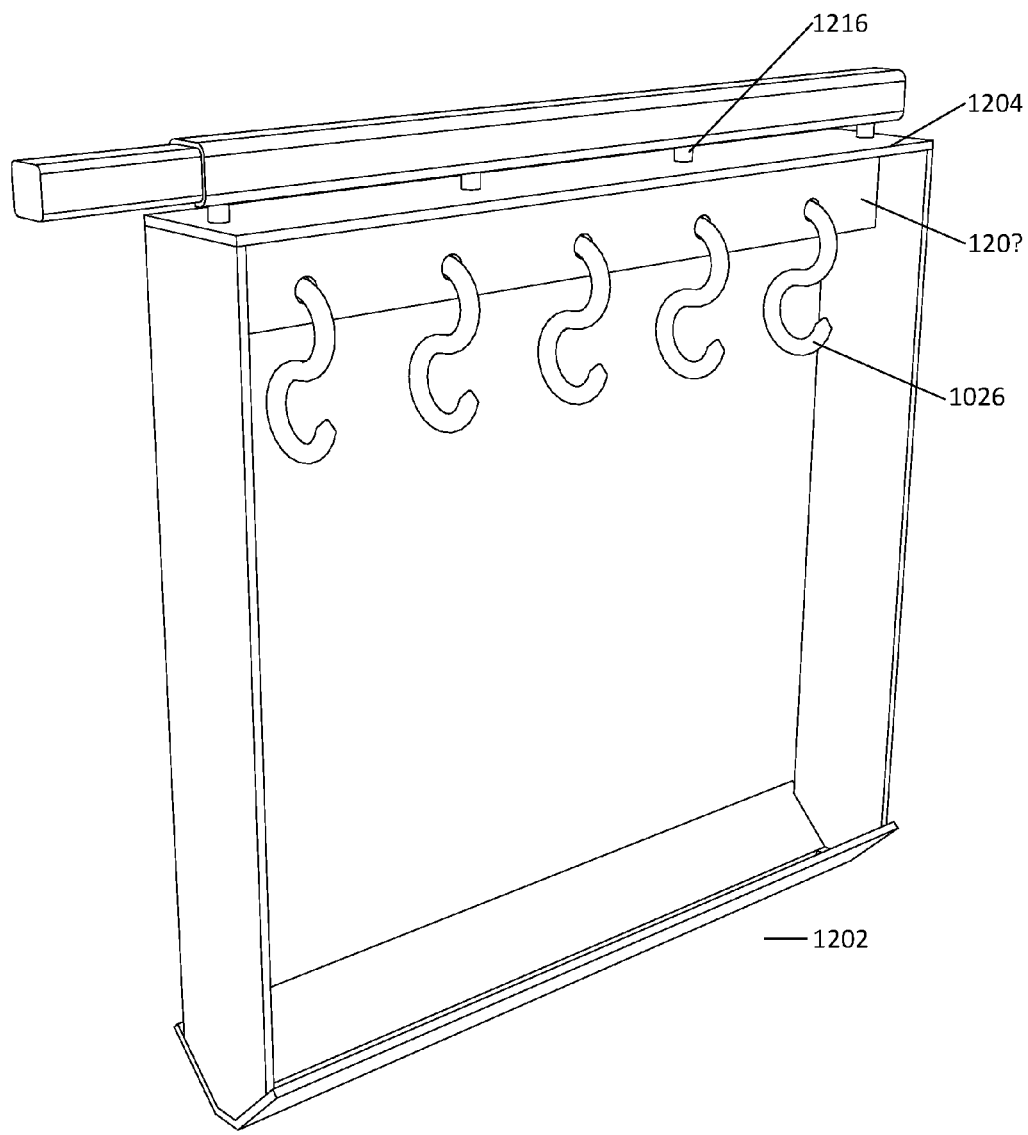
FIGS. 12A-12E shows a hook holder and its use.
Figure 12B:
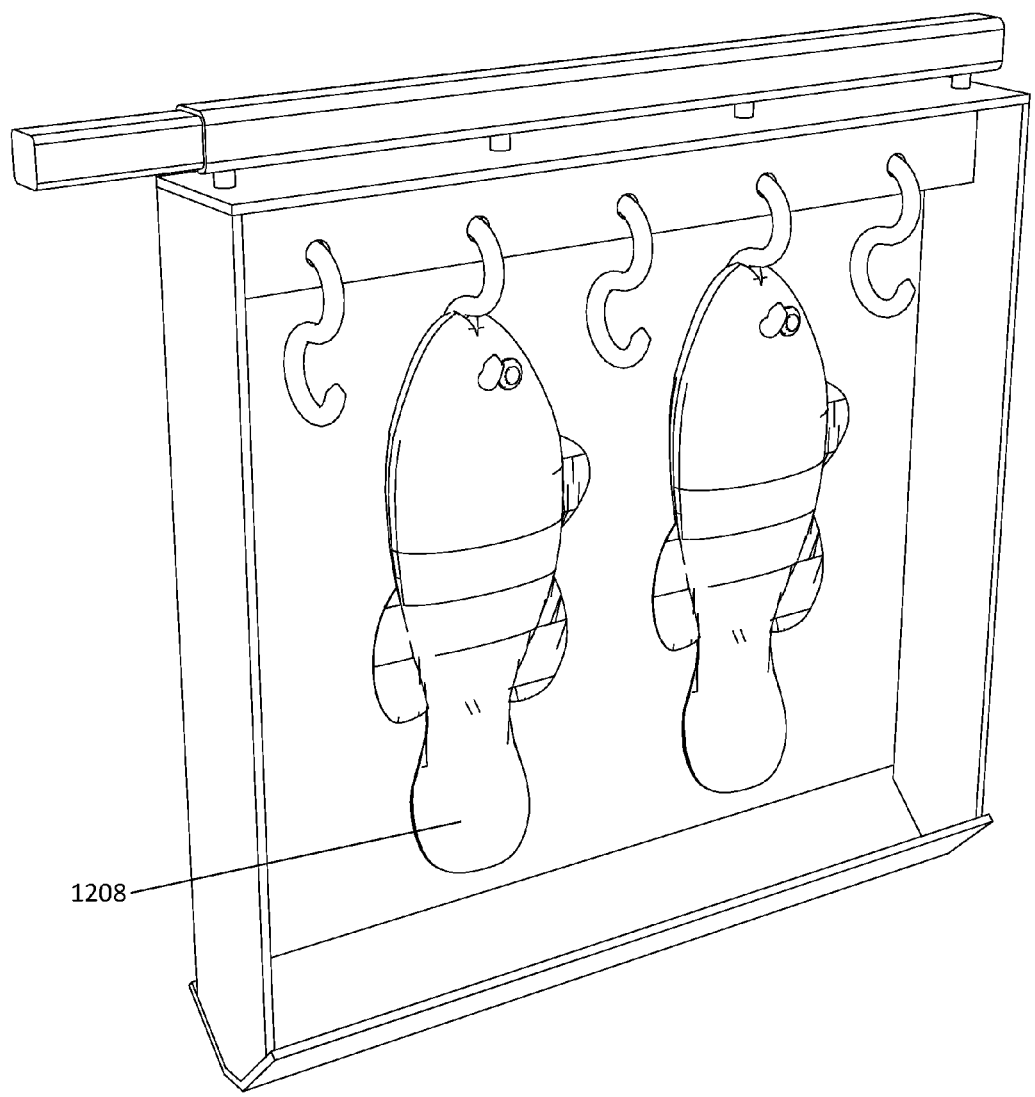
Figure 12C:
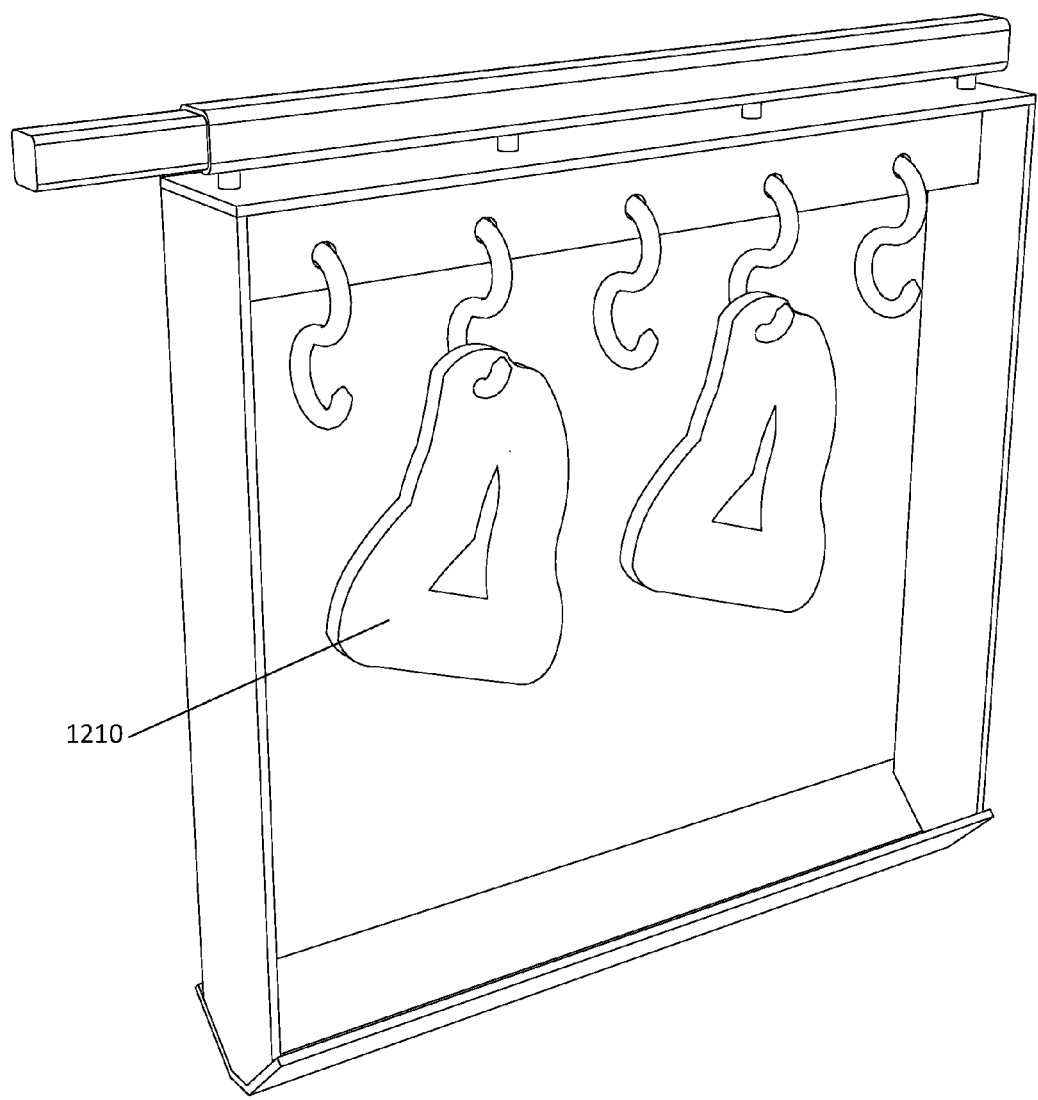
Figure 12D:
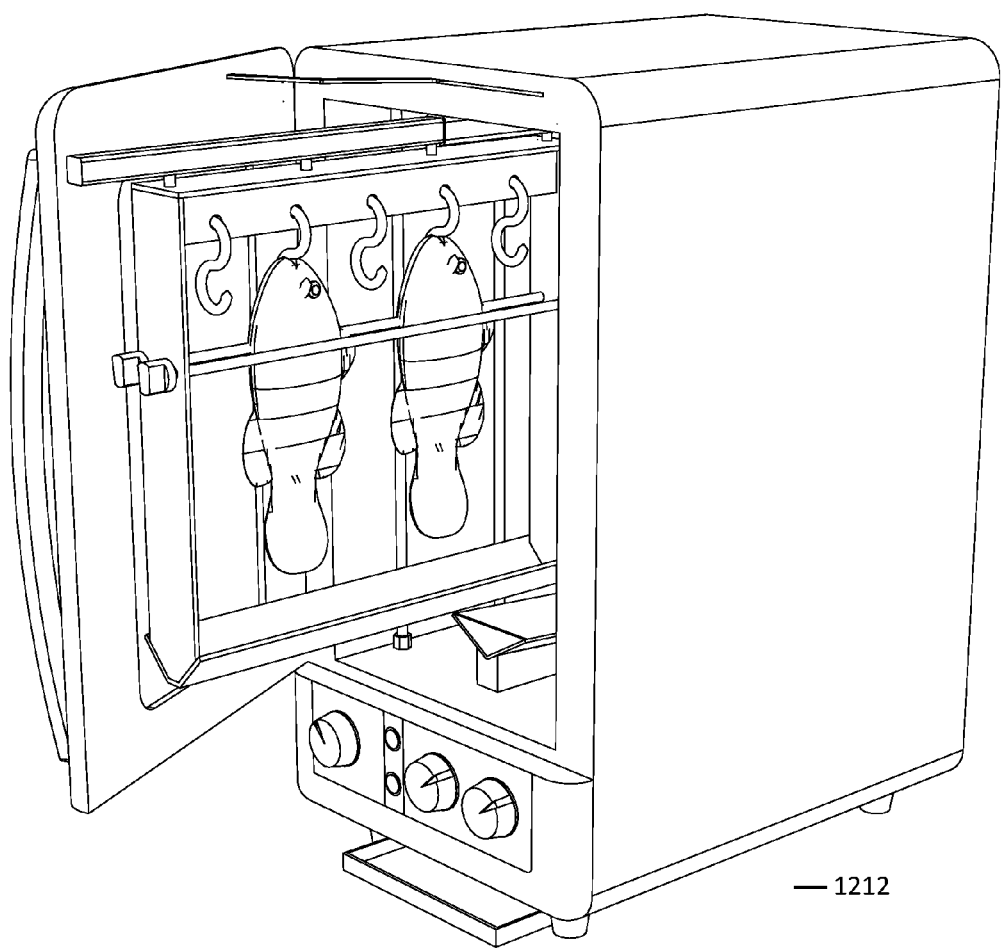
Figure 12E:
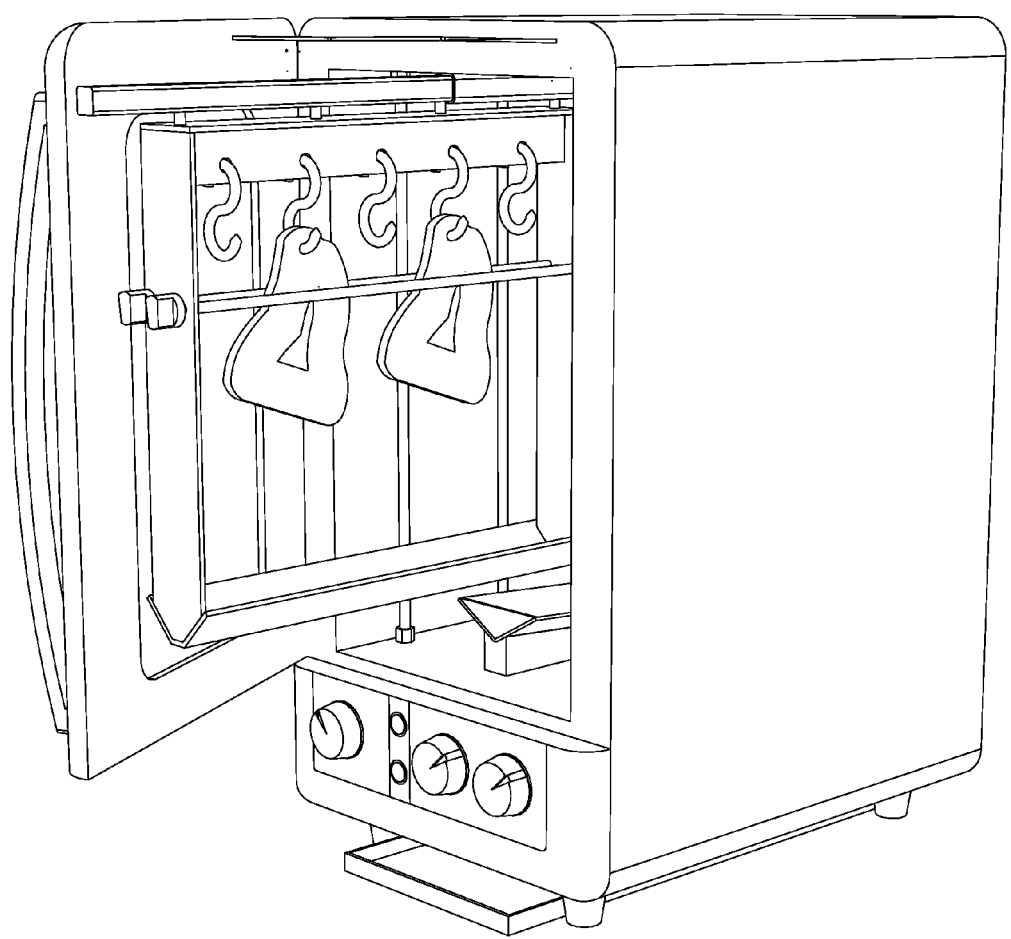

FIGS. 12A-12E shows structural details of a hook holder frame 1202. The hook holder frame comprise of four sides wherein the top side 1204 of the hook holder frame comprise of a hole 1216, wherein the size of the hole is such that the projection on the sliding rod can fit into the holes to make it a single unit. Further, the hook holder frame comprise of a strip 1206 such that the strip is used to place hook 1026 onto the strip to hold an edible item. The hook holder frame further may comprise of a supporting rod 912 to hold the edible item in place. There may be more than one supporting rod present on the hook holder frame. As shown in FIG. 12B, the frame 1202 may be used for holding an edible item such as fish 1208. As shown in FIG. 12C, the frame 1202 may be used for holding an edible item such as meat 1210. The hook holder frame can be assembled with the sliding rod and thus may be placed inside the modified oven by sliding the sliding rod into the rod frame located inside of the modified oven as shown in FIGS. 12 D (1212) and 12 E (1214).

Figure 13A:
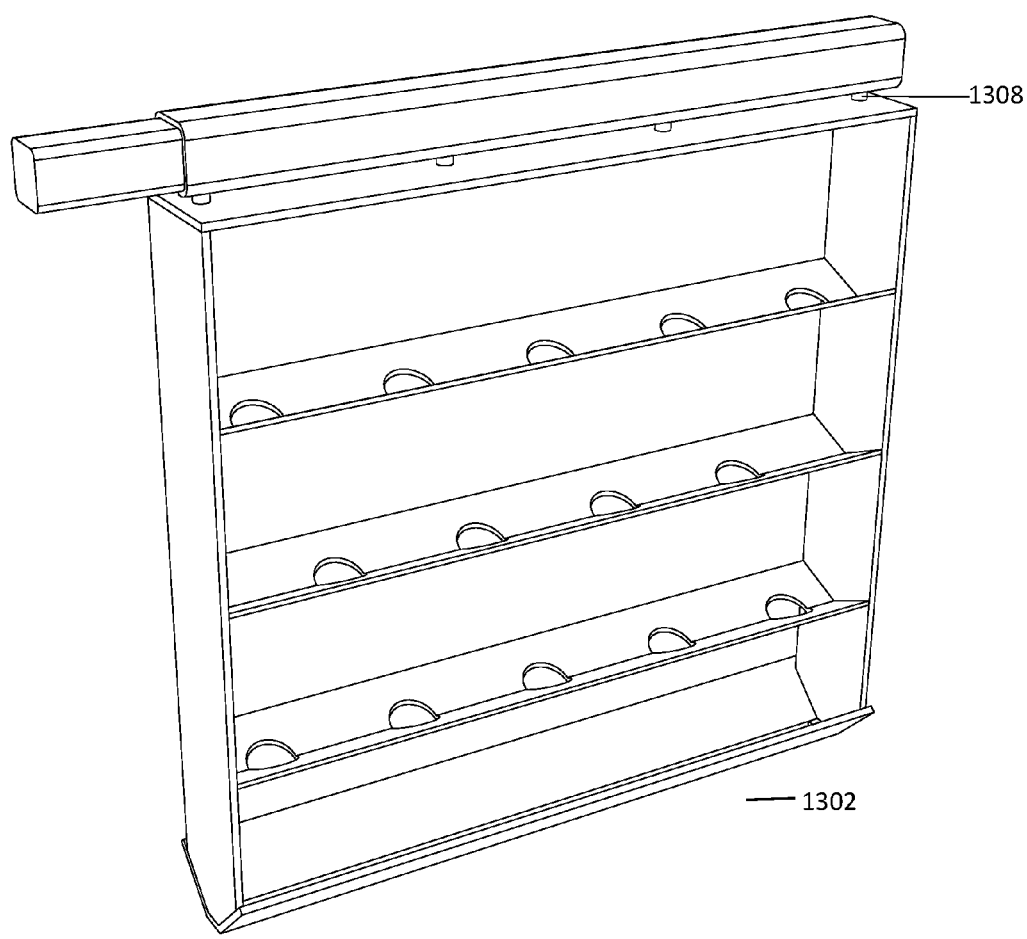
FIGS. 13A-13C shows a drum stick holder frame and its use.
Figure 13B:
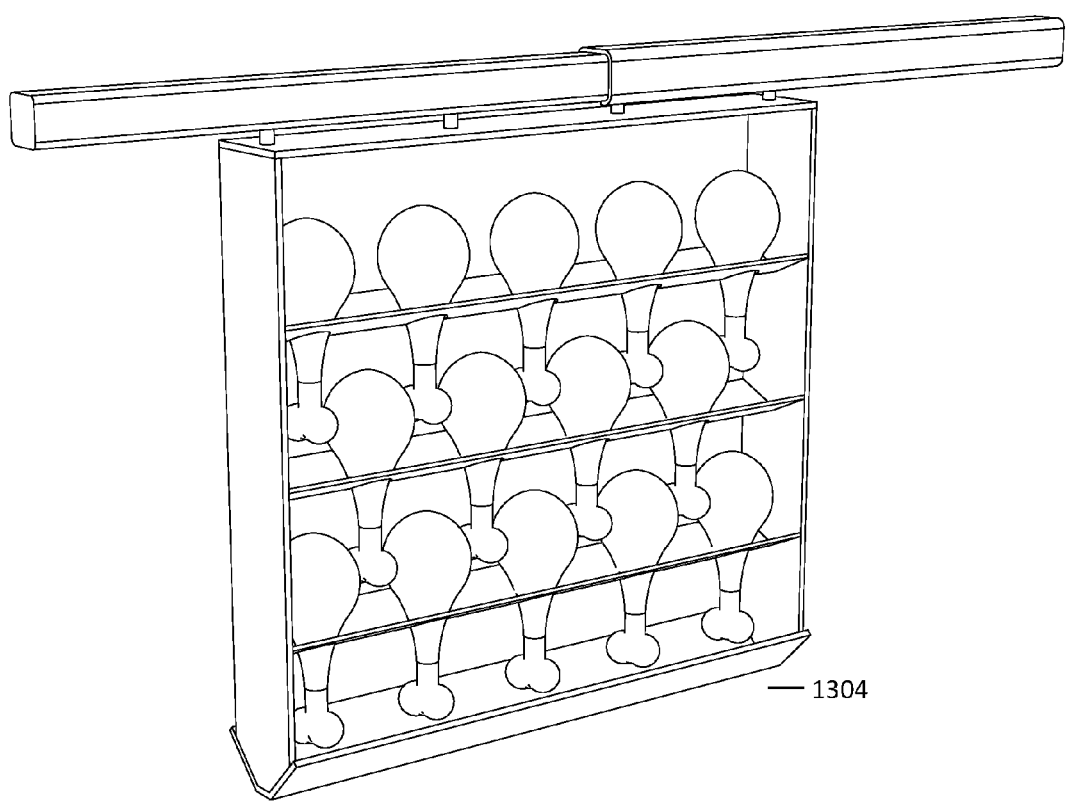
Figure 13C:
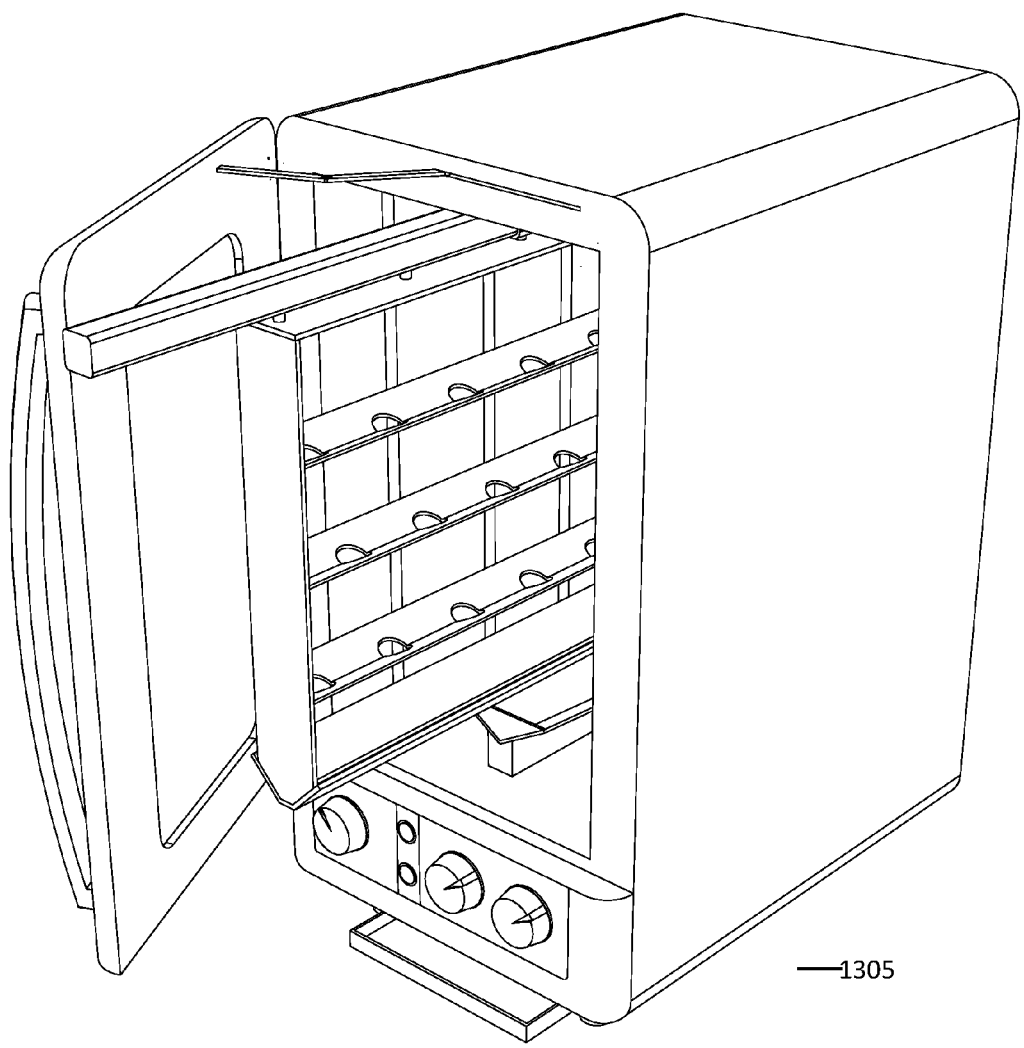
Figure 14A:
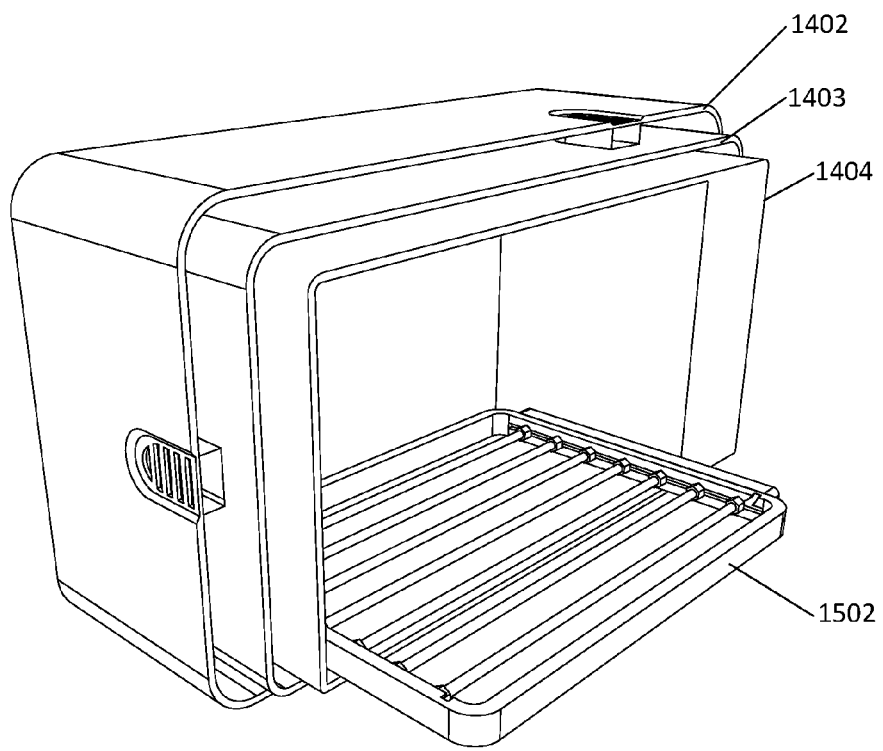
FIGS. 14A-14D shows details of a body of the modified oven.
Figure 14B:
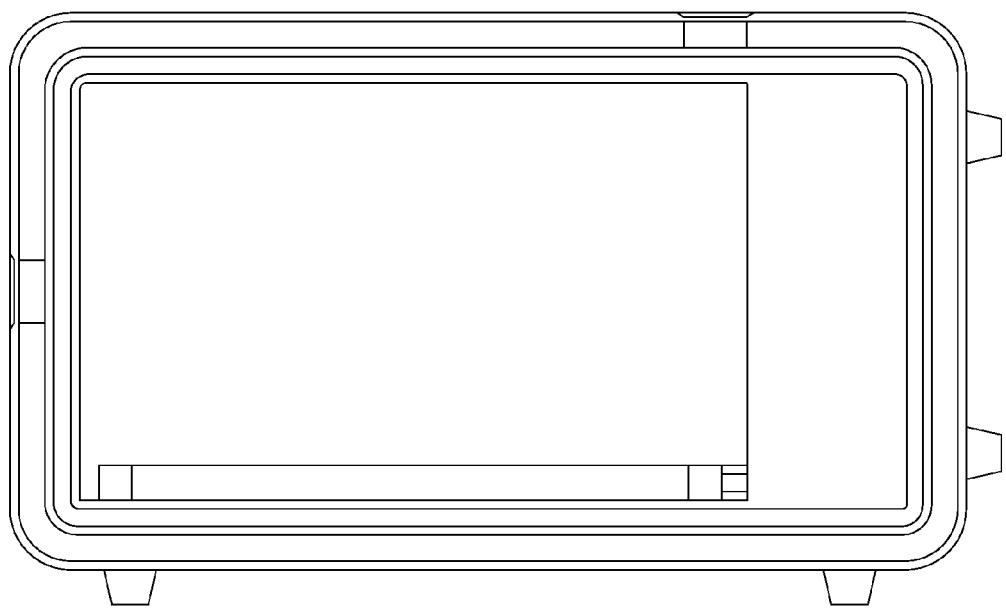
Figure 14C:
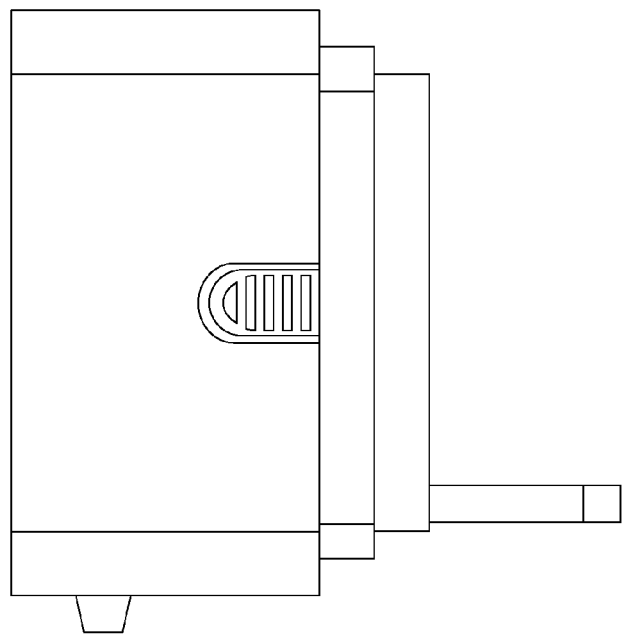
Figure 14D:
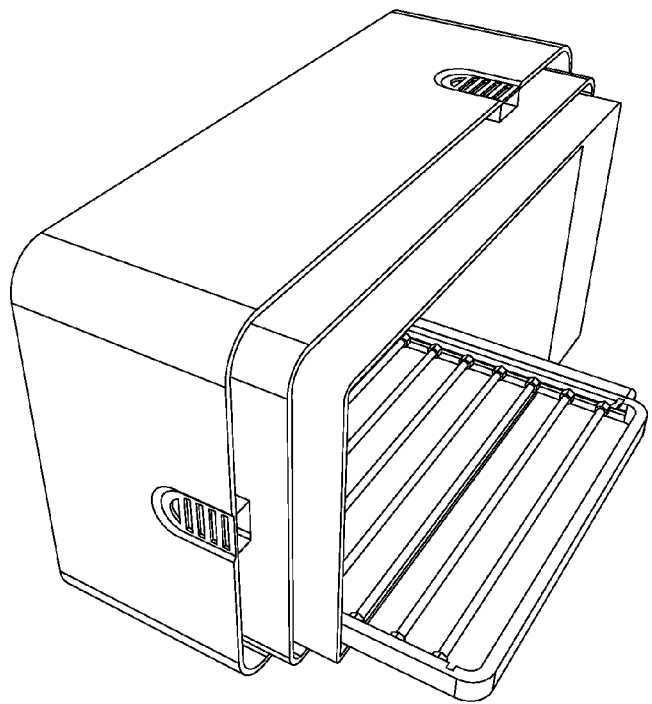
Figure 15A:
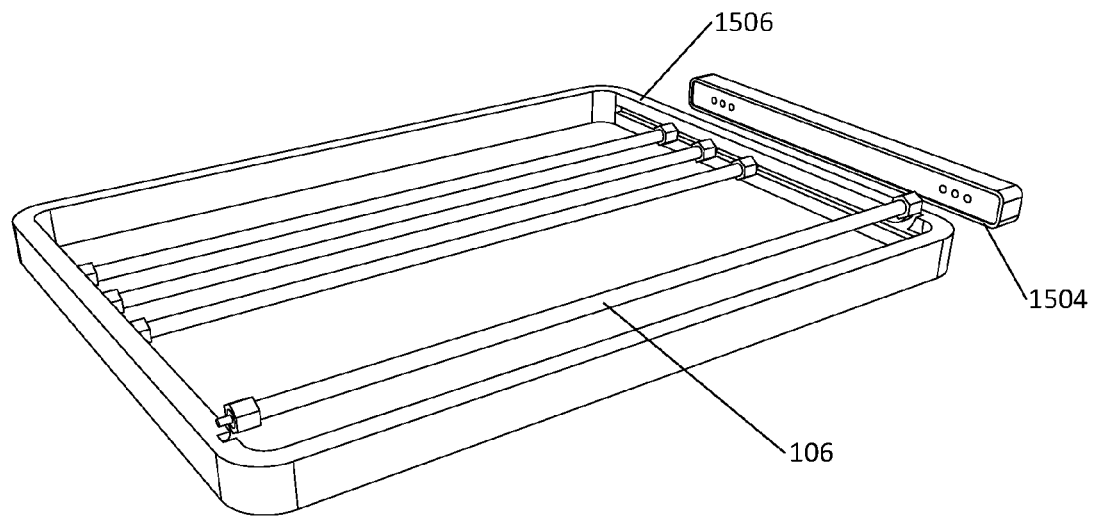
FIGS. 15A-15D shows structural details of a ceramic frame and a ceramic bar.
Figure 15B:
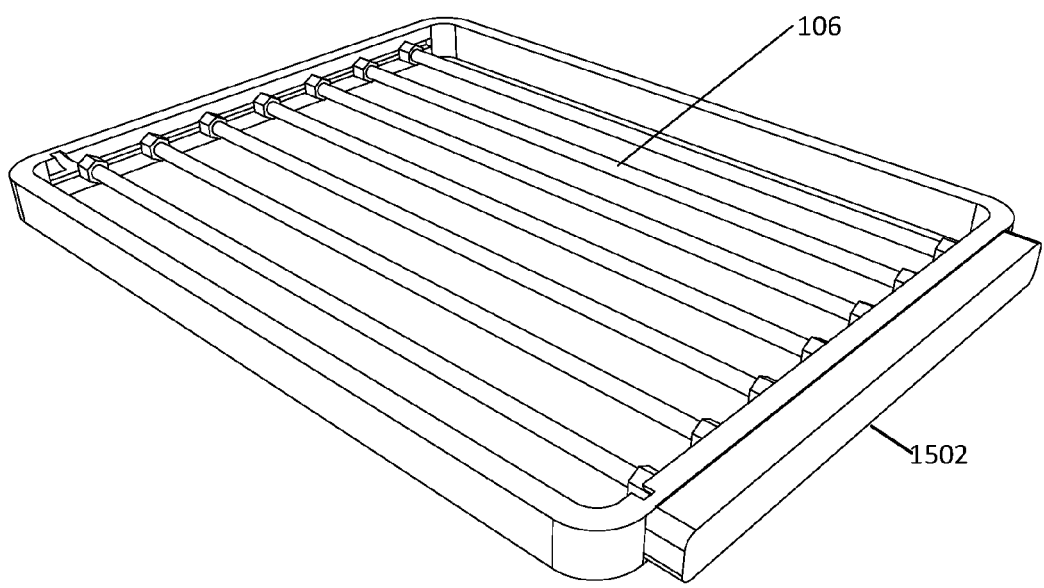
Figure 15C:
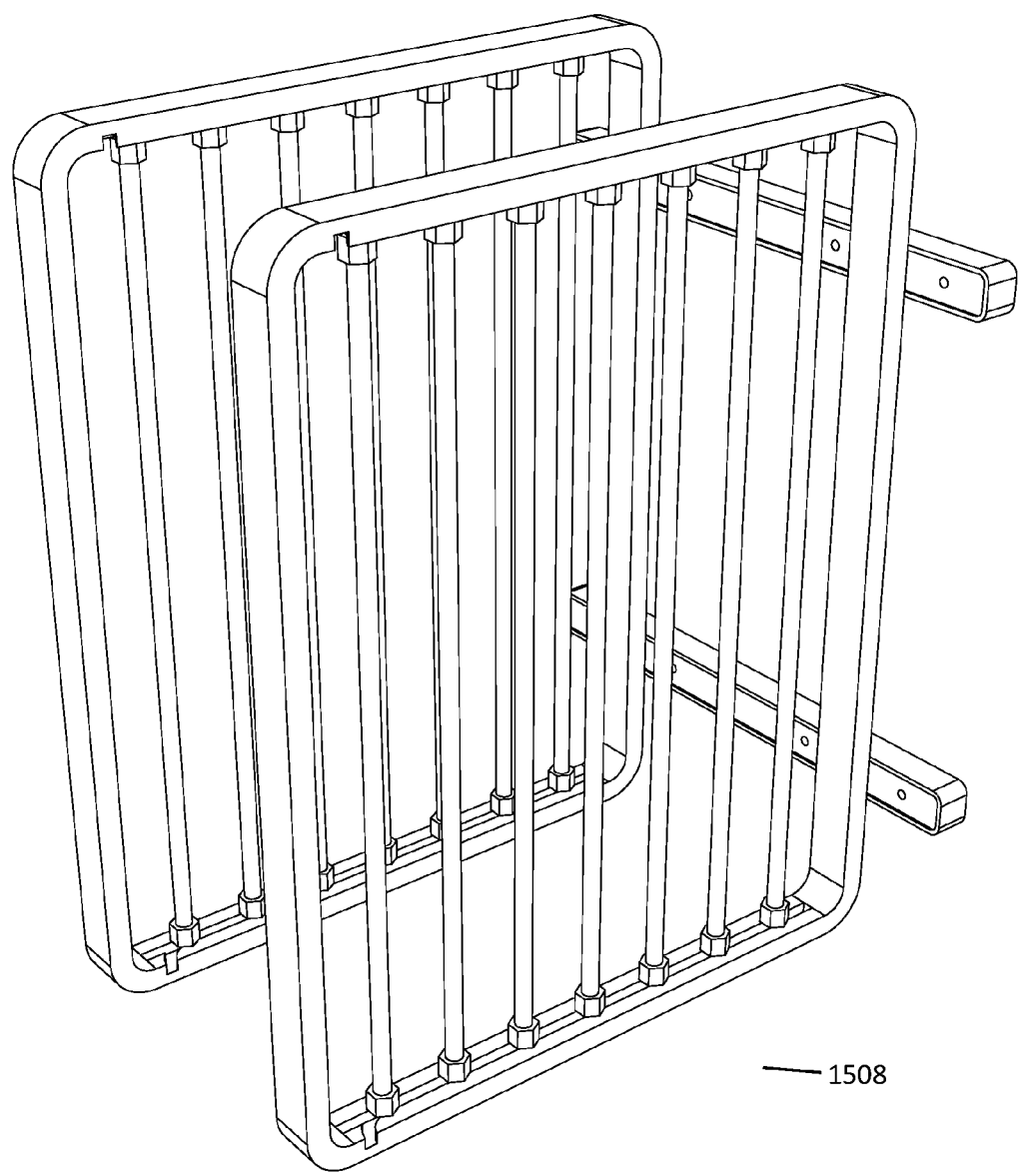
Figure 15D:
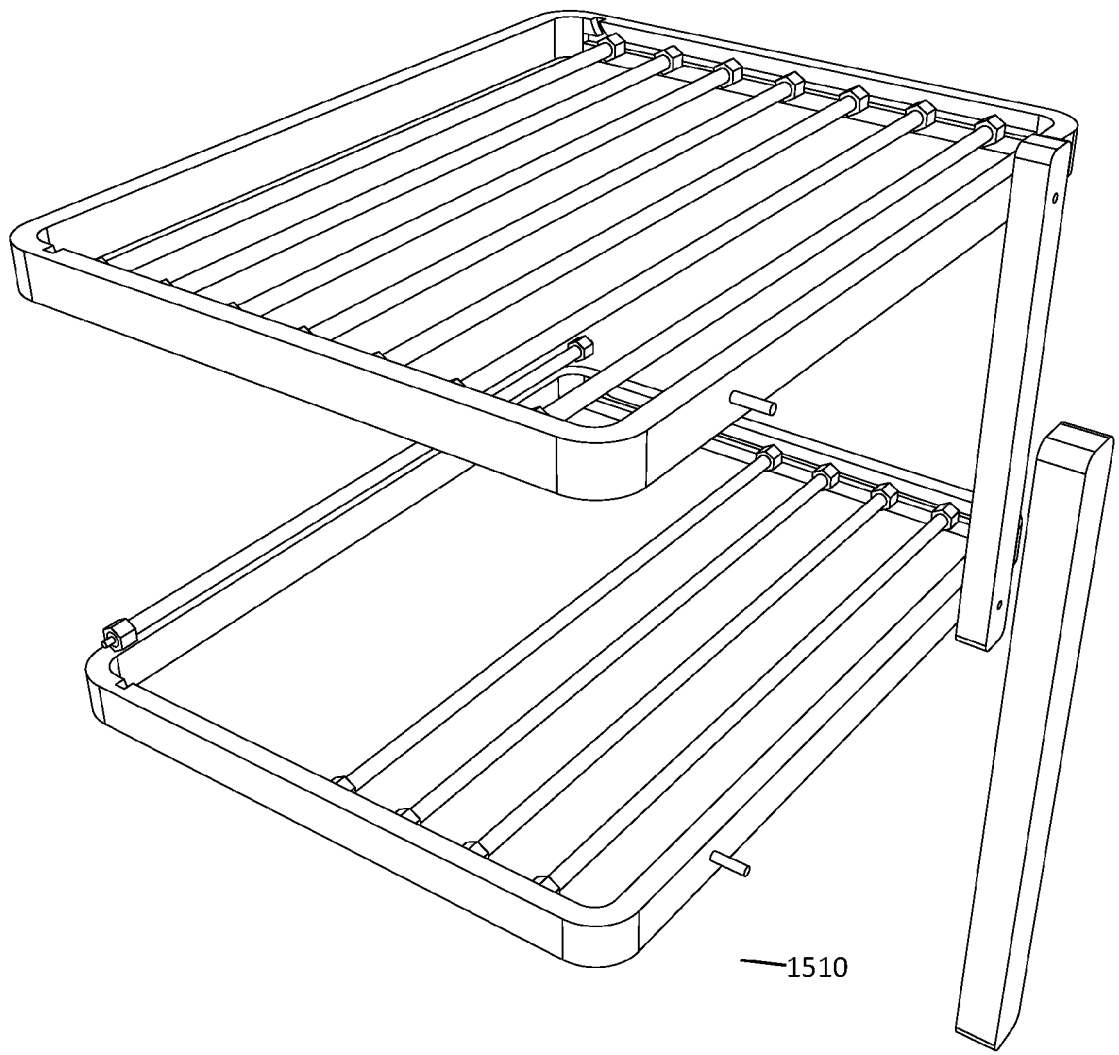

FIGS. 13A-13 C shows details of a drum stick holder frame. As shown in FIG. 13A a drum stick holder comprises of a drum stick holder frame 1302 comprise of four sides wherein the top side comprise of a hole 1308. The size of the hole is such that the projection on the sliding rod can fit into the holes to make it a single unit. As shown in FIG. 13 B the drum stick holder can be used to place a food item 1304 into the holes with the frame. The drum stick holder frame can be assembled with the sliding rod and thus may be placed inside the modified oven 1306 by sliding the sliding rod into the rod frame located inside of the modified oven as shown in FIG. 13 C.

FIGS. 14 A-14D shows structural details of the main body of the modified oven. FIG. 14A shows that the main body comprise of two metallic layers such as cover layer 1404 and outer layer 1402 and a cavity 1403 in between the cover layer and the outer layer. FIGS. 14B-14D shows the three layers of the main body from bottom side of the oven (14B) and side (14C) (14D) angles. The metal as used may be any from the known metals used in such appliances. The main body further comprise of an air grill window 802. The air grill window may be present on all the three sides of the oven (except the bottom part of the oven). The cold air could flow from the left and right side air grill window into the inner cavity and the hot air resulting from heating of the edible item may be moved out as a result from the top of the oven and thus from the sir grill window present of the top side of the body.

FIGS. 15A to 15D shows structural details of a ceramic frame 1502 and a ceramic bar 1504. The ceramic frame 1502 may be square or rectangular in shape. The ceramic frame comprise of one or more than one heating element 106. The ceramic frame may be fixed into the ceramic bar 1504. The ceramic bar comprise of a socket 1506 for fixing the ceramic frame into it. The ceramic bar may comprise of more than one socket. The modified oven comprise of more than one ceramic rod for both the sides of the oven to hold the ceramic frame 1502 with the heating element 106 into a vertical position 1508 or a horizontal position 1510 for cooking of an edible item. The ceramic frame with a ceramic bar forms an assembly to be placed inside of the oven when in use.

The edible item as disclosed may be a food item.

Further, a method of using the modified oven is disclosed. The method as disclosed comprises: placing a ceramic frame into the oven, wherein the ceramic frame is fixed with a ceramic rod and forms an assembly to be placed inside the oven frame; placing a sliding bar into the oven through a sliding rod base, wherein the sliding bar is placed over the ceramic frame or in between two ceramic frames; placing an edible item into any one of a mesh or a frame, wherein the mesh may be a grilling mesh or a heating mesh and the holder may be a skewer holder frame, an accessory holder frame, a hamburger holder frame or a hook holder frame to the projection on the sliding rod; switching ON the desired module through a control system of the modified oven to cook the edible item.

The modified oven can be used in an electronic mode or in a gas mode. The electronic mode can be used by using the ceramic frame with heating elements and the gas mode can be used by using the gas fired heater.

The modified oven as disclosed may be used in a countertop settings or in a commercial settings by adjusting the dimensions of the oven main body and its parts. The oven may have detachable parts such as ceramic frame, ceramic bar, sliding rod base. sliding rod, heating mesh, grilling mesh, heating mesh, skewer holder frame, accessory holder frame, hamburger holder frame or hook holder frame.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:
1. A modified oven comprising:
a main body including an inner cavity for cooking;
a door;
a plurality of supports attached to an exterior surface of the main body, to allow the modified oven to stand in a vertical or a horizontal position;
a ceramic frame housing, wherein the ceramic frame housing comprises a heating element;

a ceramic bar, wherein the ceramic bar holds the ceramic frame housing and forms an assembly, the assembly is attached to a surface inside the inner cavity;

a gas fired heater located underneath the heating element;

a sliding rod base with a sliding rod, wherein the sliding rod base has four sides forming a hollow frame and one side of the four sides has an opening to receive the sliding rod, wherein the sliding rod has one or more a projections and the one or more projections slides along the opening;

a hamburger holder to accommodate a hamburger meat; the sliding rod is attached to the hamburger holder for allowing the hamburger meat attached to the hamburger holder to slides into the inner cavity to be cooked, wherein the hamburger holder comprises of at least one ring to hold the hamburger meat in place for cooking, the at least one ring is attached to a holder plate, the holder plate comprising multiple slots, and the at least one ring fits in one of the multiple slots to hold the hamburger meat in place while the modified oven is in operation, wherein the holder plate is configured to have multiple rings to be placed in equal distances apart, a drip tray for collecting grease while cooking the hamburger meat, the holder plate and the at least one ring are attached to a frame having four walls, the one or more projections attachable to a top wall of the frame having four walls.

2. The modified oven of claim 1, further comprising:
a drip bar; and
a control system to control functions for baking, heating, toasting, roasting, grilling and broiling to cook the edible item.

3. The modified oven design of claim 2, wherein the drip bar is a V-shape bar such that it can collect excess oil or other residual from the hamburger meat.

4. The modified oven of claim 1, wherein the main body consists of multiple metallic layers that surrounds the inner cavity and the metallic layers separated by a cavity to allow air flow.

5. The modified oven of claim 4, wherein a most outer metallic layer of the metallic layers comprise of an air grill window to allow the flow of air into and out of the modified oven.

6. The modified oven design of claim 1, wherein the heating element is electric, wherein the modified oven can be used in an electric mode or in a gas mode.

7. The modified oven design of claim 6, wherein the modified oven can be used in the electric mode by using the ceramic frame housing with the heating element.

8. The modified oven design of claim 6, wherein the modified oven can be used in the gas mode by using the gas fired heater.

9. The modified oven of claim 1, wherein the ceramic frame may be fixed or detached.

10. The modified oven design of claim 1, wherein the ceramic frame comprise more than one heating element.

11. The modified oven design of claim 1, wherein the modified oven can be used in a horizontal position or vertical position.

12. A modified oven with detachable parts, comprising:
a main body including a cavity for cooking;
a door;
a support, wherein the support allows the modified oven to stand in a vertical position;
a ceramic frame, wherein the ceramic frame comprise of a heating element;

a ceramic rod; wherein the ceramic frame is fixed with the ceramic rod to form an assembly;

a sliding rod base with a sliding rod, wherein the sliding rod base has four sides forming a hollow frame and one side of the four sides has an opening to receive the sliding rod, wherein the sliding rod has one or more a projections and the one or more projections slides along the opening;

a skewer holder comprising a frame with four sides, wherein the four sides consist of a top side, a left side, a right side and a bottom side, the top side has one or more holes, the left side have a plurality of holes arranged longitudinal on the left side, the right side have a plurality of holes arranged longitudinal on the right side, wherein the plurality of holes on the left side and the plurality of holes on the right side are horizontally aligned; a plurality of spikes, wherein each of the plurality of spikes have a support arm that is configured to be inserted in one of the plurality of holes on the left side or the right side and each of the plurality of spikes have multiple protrusions;

a plurality of rods to hold an edible item, wherein a support arm of one of the plurality of spikes is inserted in one of the plurality of holes on the left side and a support arm of another one of the plurality of spikes is inserted in one of the plurality of holes of the right side that is horizontally aligned with the hole on the left side wherein the support arm is inserted, and the plurality of spikes supports the plurality of rods that hold the edible item, wherein the one or more a projections of the sliding rod are attached to the one or more holes of the top side; and a control system to control functions for baking, heating, toasting, roasting, grilling and broiling to cook the edible item.

13. The modified oven of claim 12, further comprising:
a collecting tray.

14. The modified oven of claim 12, wherein the ceramic frame may be fixed or detached.

15. The modified oven of claim 12, wherein the sliding rod base may be attached or detached from the modified oven.

16. A modified oven, comprising:
a main body including a cavity for cooking;
a door;
a plurality of supports, to allow the modified oven to stand in a vertical or a horizontal position;
a ceramic frame housing, wherein the ceramic frame housing comprises a heating element;
a ceramic bar, wherein the ceramic bar holds the ceramic frame housing and forms an assembly, the assembly is attached to a surface inside the cavity;
a gas fired heater located underneath the heating element;
and
a sliding rod base with a sliding rod, wherein the sliding rod base has four sides forming a hollow frame and one side of the four sides has an opening to receive the sliding rod, wherein the sliding rod has one or more a projections and the one or more projections slides along the opening;
an accessory holder frame comprising a combination of food holders to accommodate edible items to be cooked, the accessory holder frame comprising four sides, wherein the four sides consist of a top side, a left side, a right side and a bottom side, the top side has one or more holes, the left side have a plurality of holes arranged longitudinal on the left side, the right side have a plurality of holes arranged longitudinal on the right side, wherein the plurality of holes on the left side and the plurality of holes on the right side are horizontally aligned, wherein the one or more a projections of the sliding rod has are attached to the one or more holes of the top side; the food holders are a combination of:

a skewer holder comprising a pair of spikes, wherein one of the pair of spikes have a support arm that is configured to be inserted in one of the plurality of holes on the left side and one of the pair of spikes have a support arm that is configured to be inserted in one of the plurality of holes on the right side, and each of the pair of spikes have multiple protrusions; a plurality of rods, wherein each of the plurality of rods rest on one of the multiple protrusions of the spike that is inserted on the left side and one of the multiple protrusions on the spike inserted on the right side;

a drum stick holder comprising a rod with a plurality of holes arranged longitudinal along the rod, wherein each of the holes can hold an edible item for grilling or broiling, a support arm attached to each end of the rod, wherein each support arm has a protrusion for inserting into one of the plurality of holes on the left side and the right side; and an edible food holder for steaks or fishes to be hung in a vertical position comprising a rod with hooks arranged longitudinal along the rod placed equal distances from each other, a support arm attached to each end of the rod, wherein each support arm has a protrusion for inserting into one of the plurality of holes on the left side and the right side.

17. The modified oven of claim 16, comprising:
a square metallic rod for inserting and removing the edible food.

18. The modified oven of claim 16, further comprising:
a V-shaped tray to collect dripping of food juice during the cooking process; and
a square tray for placing outside and under the modified oven to collect the liquid from the V-shaped tray.

* * * * *